(12) United States Patent
Beavis

(10) Patent No.: US 9,321,509 B2
(45) Date of Patent: Apr. 26, 2016

(54) SNOWMOBILE SKID FRAME ASSEMBLY

(71) Applicant: Arctic Cat Inc., Thief River Falls, MN (US)

(72) Inventor: Andrew Beavis, Goodridge, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 27 days.

(21) Appl. No.: 14/109,760

(22) Filed: Dec. 17, 2013

(65) Prior Publication Data

US 2015/0166143 A1    Jun. 18, 2015

(51) Int. Cl.
*B62M 27/02* (2006.01)
*B62D 55/07* (2006.01)

(52) U.S. Cl.
CPC ............... *B62M 27/02* (2013.01); *B62D 55/07* (2013.01); *B62M 2027/026* (2013.01); *B62M 2027/027* (2013.01); *B62M 2027/028* (2013.01)

(58) Field of Classification Search
CPC .. B62M 2027/026; B62M 27/02; B62D 55/07
See application file for complete search history.

(56) References Cited

U.S. PATENT DOCUMENTS

| | | | |
|---|---|---|---|
| 3,658,392 A | 4/1972 | Perreault et al. | |
| 3,750,775 A | 8/1973 | Valentine | |
| 5,586,614 A | 12/1996 | Kouchi et al. | |
| 5,727,643 A | 3/1998 | Kawano et al. | |
| 6,109,382 A * | 8/2000 | Kubota | 180/190 |
| 7,018,005 B2 | 3/2006 | Lemieux | |
| 7,124,845 B2 | 10/2006 | Pyykonen | |
| 7,360,618 B2 | 4/2008 | Hibbert et al. | |
| 7,913,785 B2 | 3/2011 | Korsumaki et al. | |
| 2002/0153186 A1 | 10/2002 | Lemieux | |
| 2009/0152037 A1 | 6/2009 | Brazier | |
| 2014/0182960 A1* | 7/2014 | Bedard et al. | 180/190 |
| 2014/0202784 A1* | 7/2014 | Mallette | 180/190 |

FOREIGN PATENT DOCUMENTS

| | | |
|---|---|---|
| CA | 2498574 A1 | 9/2005 |
| CA | 2617468 A1 | 6/2008 |
| CN | 101472784 A | 7/2009 |

(Continued)

OTHER PUBLICATIONS

Alouette Delivers Product Brochure (1973): p. 5 and 15 (3 pgs.).

(Continued)

*Primary Examiner* — Kevin Hurley
(74) *Attorney, Agent, or Firm* — Billion & Armitage; Benjamin C. Armitage

(57) ABSTRACT

A skid frame for a snowmobile is disclosed including a generally planar skid surface extending between front and rear idler wheels. The front and rear idler wheel are offset from one another and define a longitudinal direction. A track encircles the skid frame having the skid surface positioned over a center of the track such that a major longitudinally extending portion of the track that is coextensive with the skid surface has first and second unsupported lateral portions on either side of the skid surface. The first and second unsupported lateral portions extend in the horizontal direction at least 25 percent of a width of the track. A suspension arm member may mount the skid rail and include mount portions for mounting to a tunnel and spanning a distance at least twice the width of the longitudinal beam.

31 Claims, 23 Drawing Sheets

(56) References Cited

FOREIGN PATENT DOCUMENTS

JP          H037674 A       1/1991
WO      WO2011075141 A1    6/2011

OTHER PUBLICATIONS

Invitation to Snowmobiling (Oct. 1973), "Invitation to Snowmobiling's Complete Guide to 1974 Snowmobiles," p. 81-82 (4 pgs).

Invitation to Snowmobiling, "Comparison Test: 3 Wankels—Arctic Cat Panther vs. Alouette Silver Cloud vs. Skiroule RTW" (Nov. 1973): p. 32-39 (11 pgs).

Invitation to Snowmobiling, "What's going on here?" (Nov. 1973): p. 17-18 (5 pgs).

Snowmobile Service Manual 8$^{th}$ Edition: p. 34-35 (4 pgs.).

Rankin, D., "How Rotaries Really Perform," Snowgoer (Dec. 1973): p. 44-45, 49-50 (6 pgs).

Bassett, J., "2-Strokes and 4-Strokes and Rotaries, Oh My!" Snowmobile.com (Aug. 13, 2015): 5 pgs. <<http://www.snowmobile.com/products/2strokes-and-4strokes-and-rotaries-oh-my-1983.html>>.

Bassett, J., "Ski-Doo ACE 900 Engine Review," Snowmobile.com (Mar. 14, 2013): 6 pgs. <<http://www.snowmobile.com/products/skidoo-ace-900-engine-review-1682.himl>>.

Bassett, J., "74 Alouette Silver Cloud," American Snowmobiler (Oct. 2006): p. 98.

EZ-Ryde Carve™, Great Lakes Sound & Vibration Inc. (Copyright 2015) https://ezryde.com/ezryde-carve/mountain/ Accessed on Sep. 1, 2015, earliest archive by web.archive.org dated Aug. 14, 2015.

EZ-Ryde Installation, Tuning, and Maintenance Manual https://ezryde.com/wp-content/uploads/2014/12/EZRyde_manual.pdf Accessed on Sep. 1, 2015, no archival date available.

SnowWest Forum, "New product: EZ-Ryde Carve™ Rear Suspension" (Aug. 26, 2014) http:/www.snowest.com/forum/showthread.php?t=378178.

International Search Report for corresponding International Application No. PCT/US2014/070669 mailed on Mar. 20, 2015.

Written Opinion for corresponding International Application No. PCT/US2014/070669 mailed on Mar. 20, 2015.

* cited by examiner

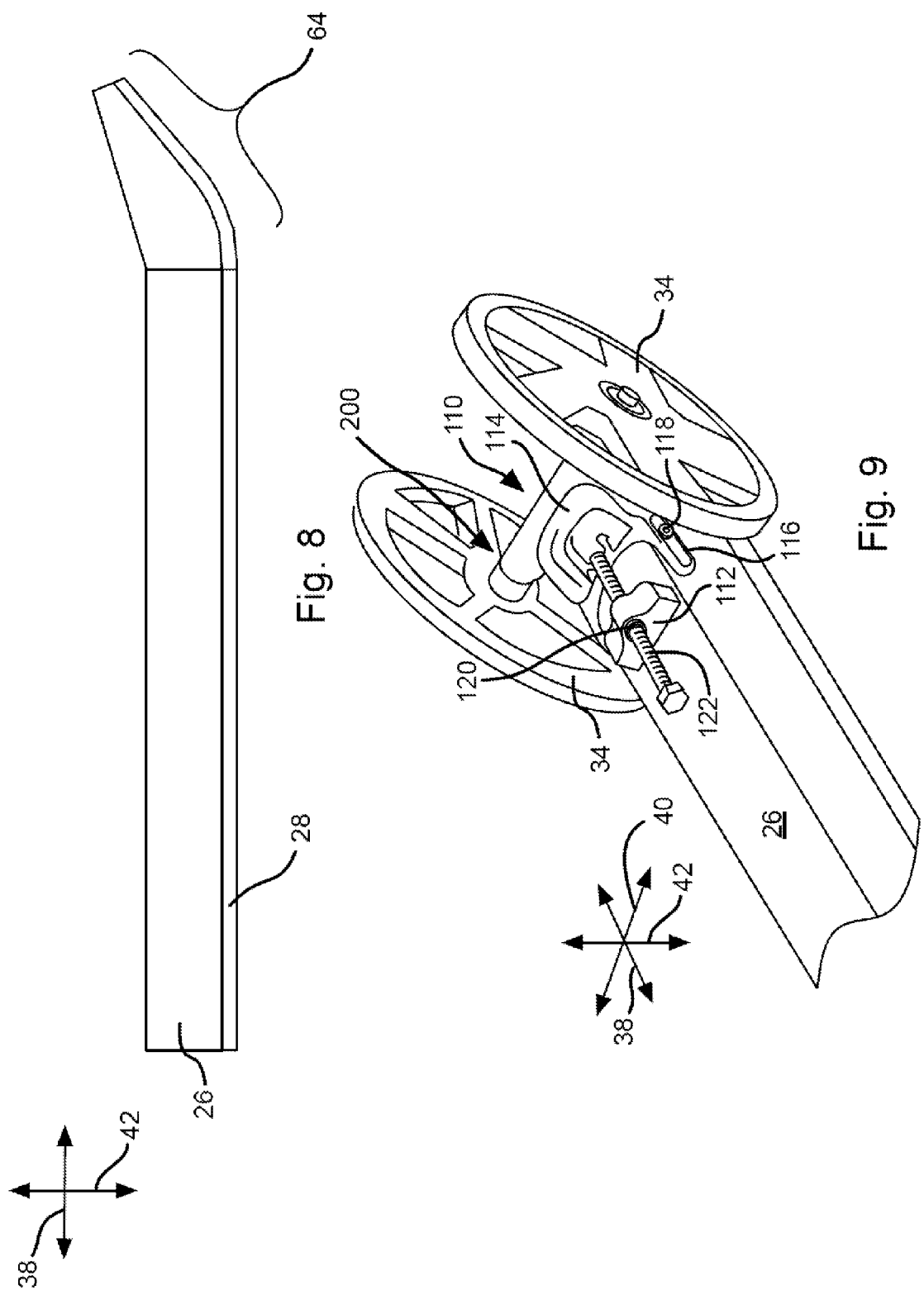

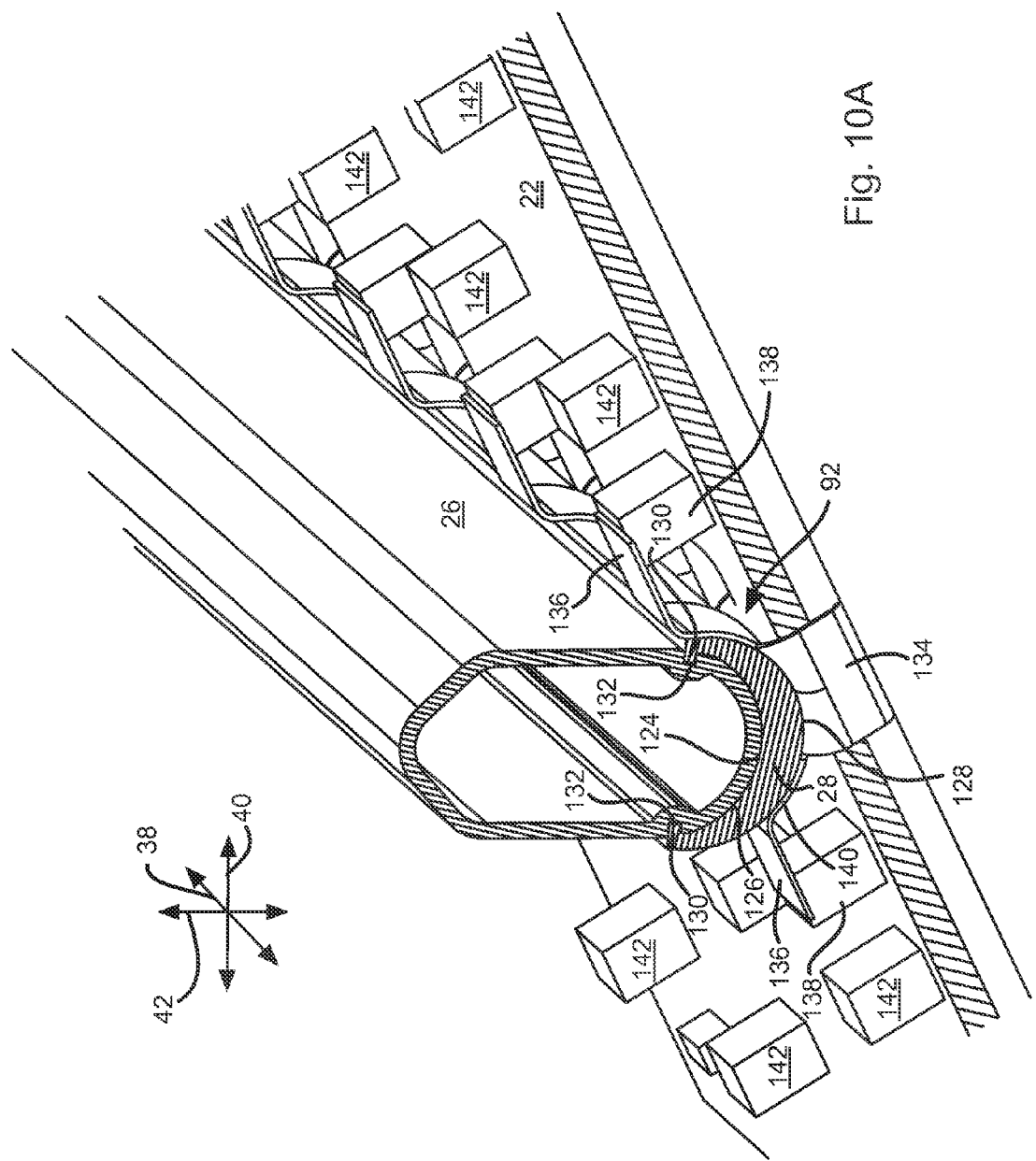

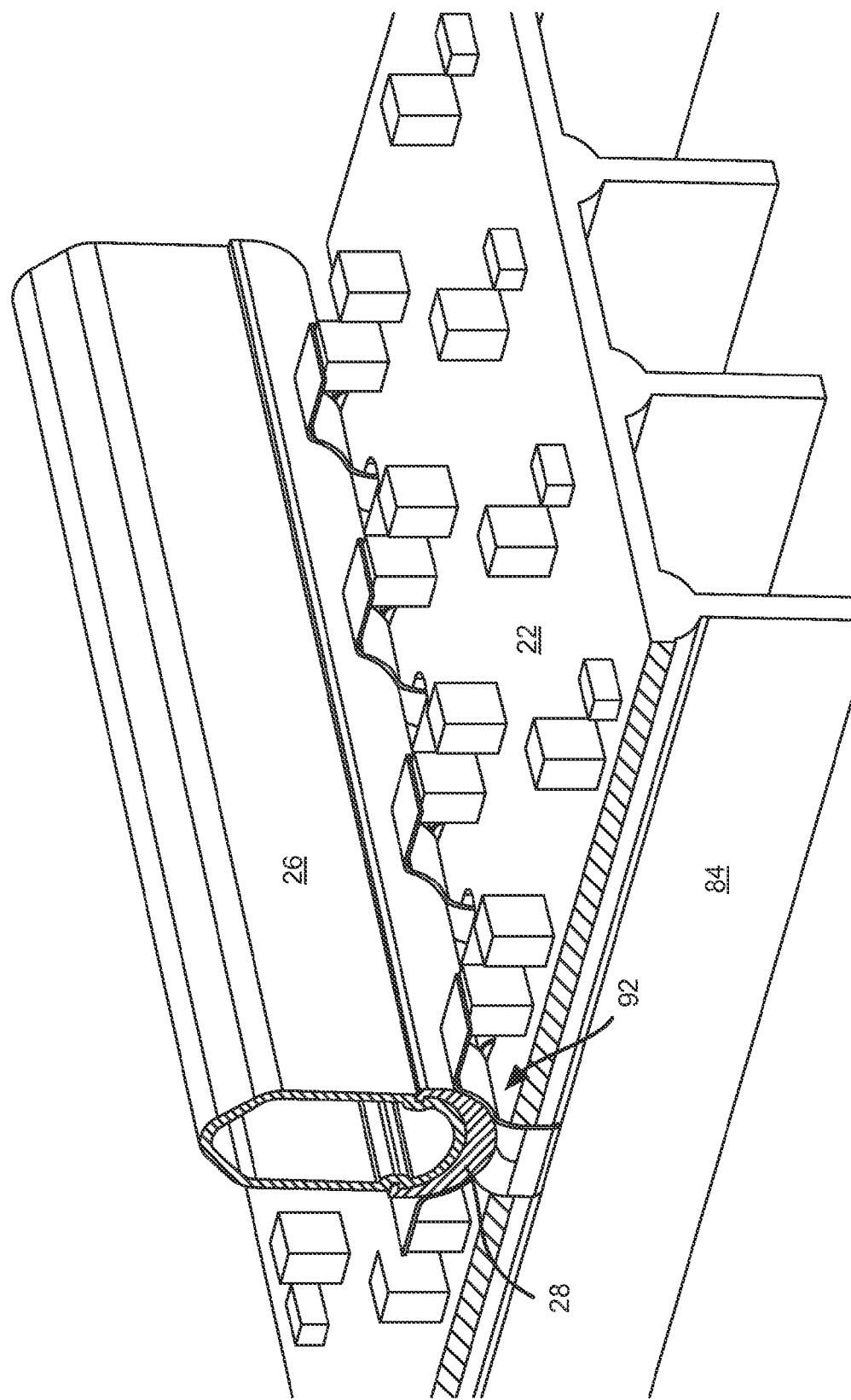

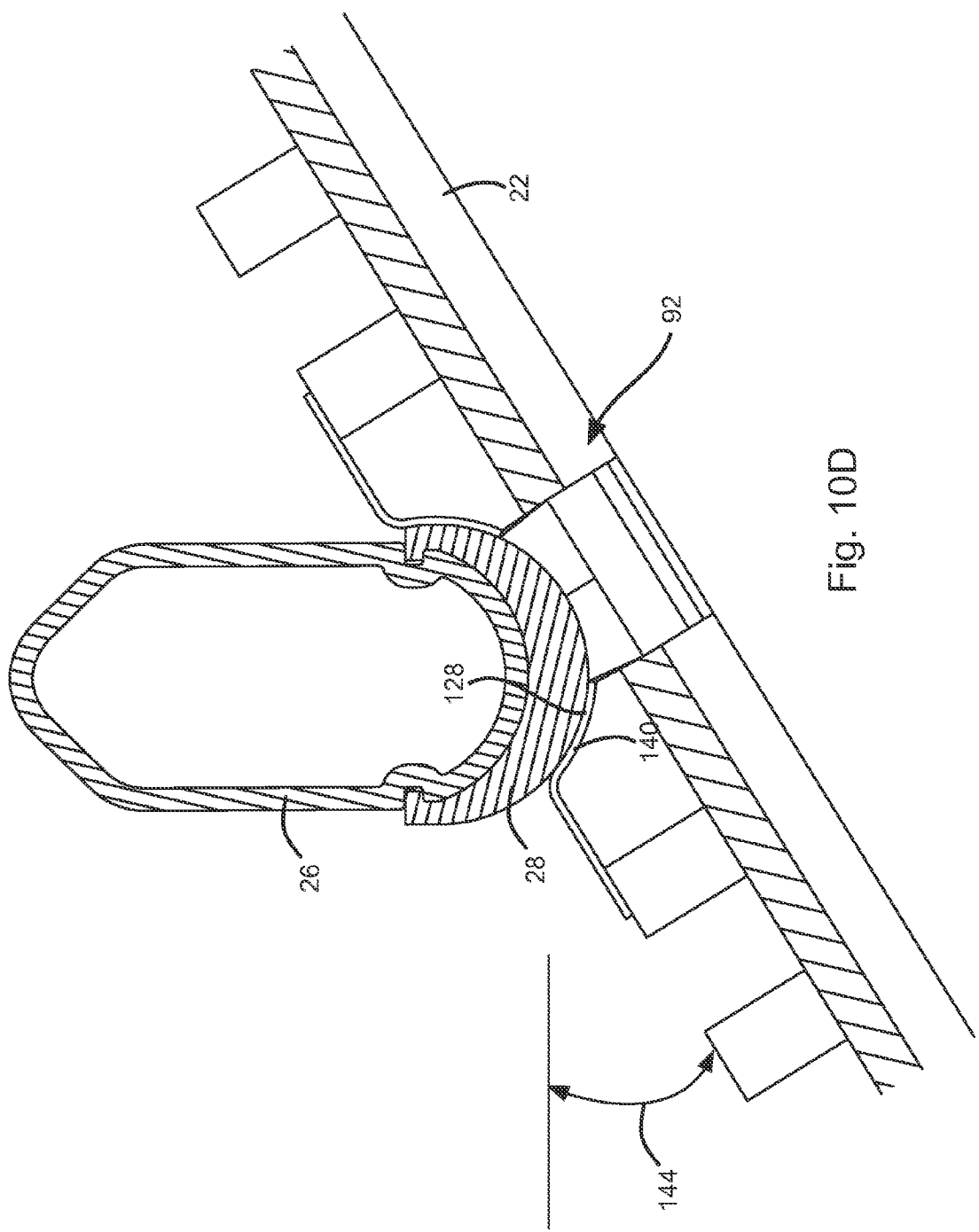

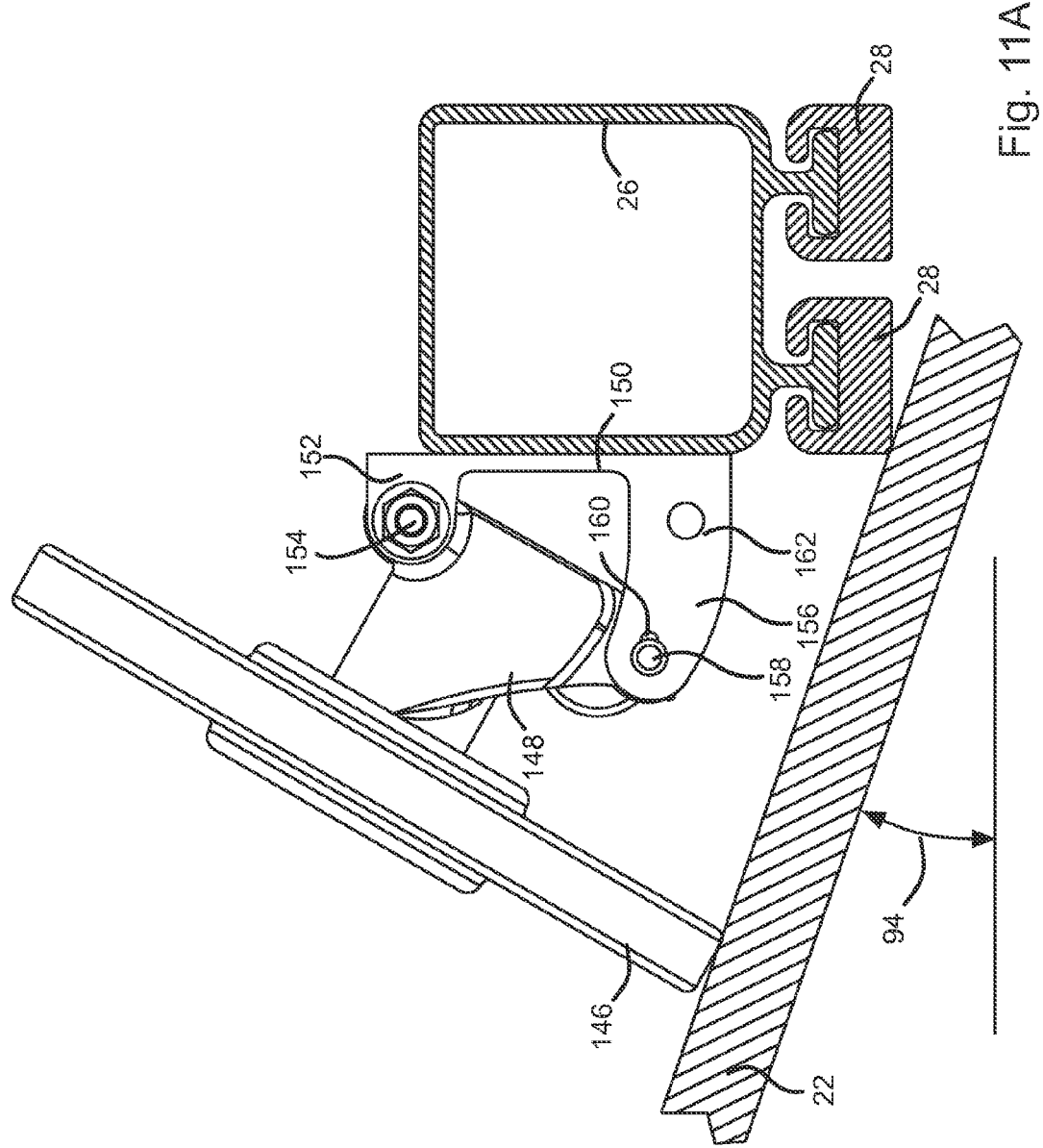

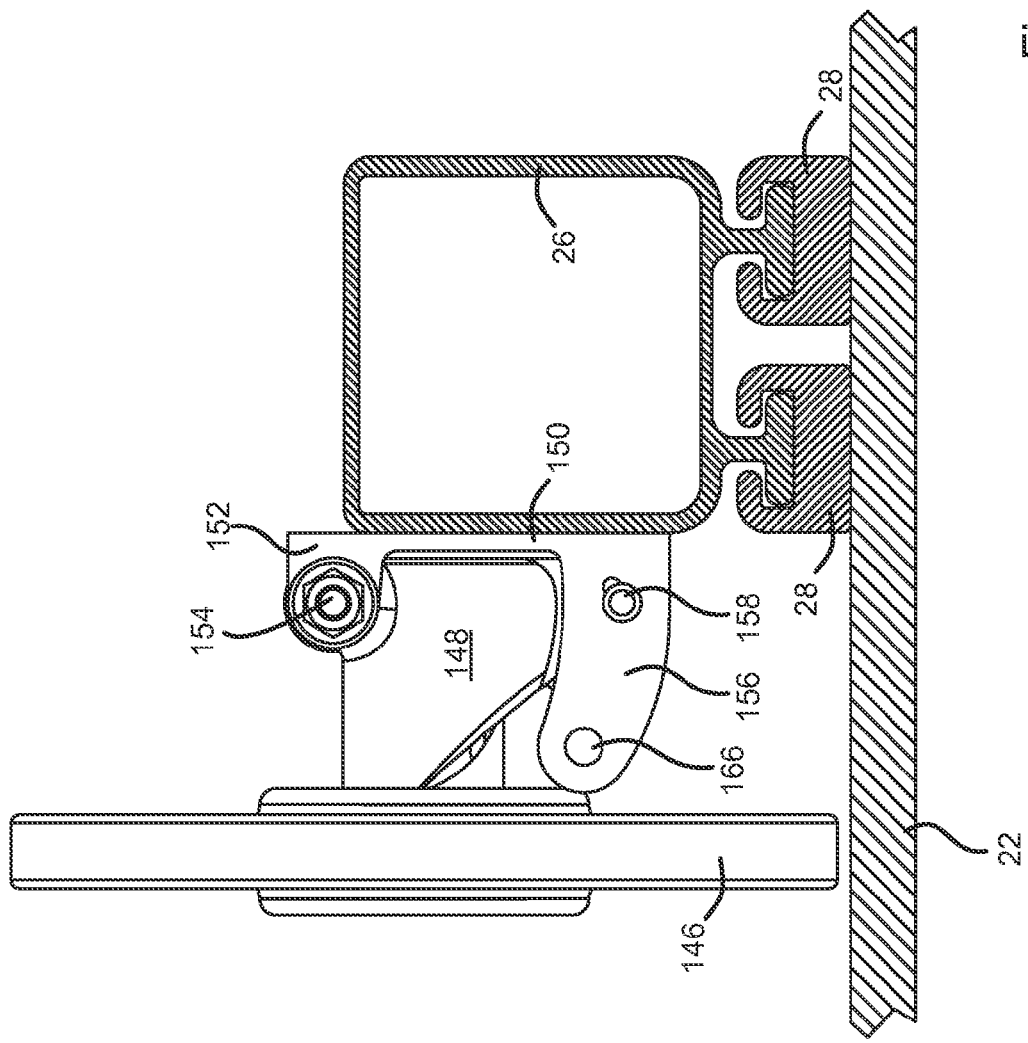

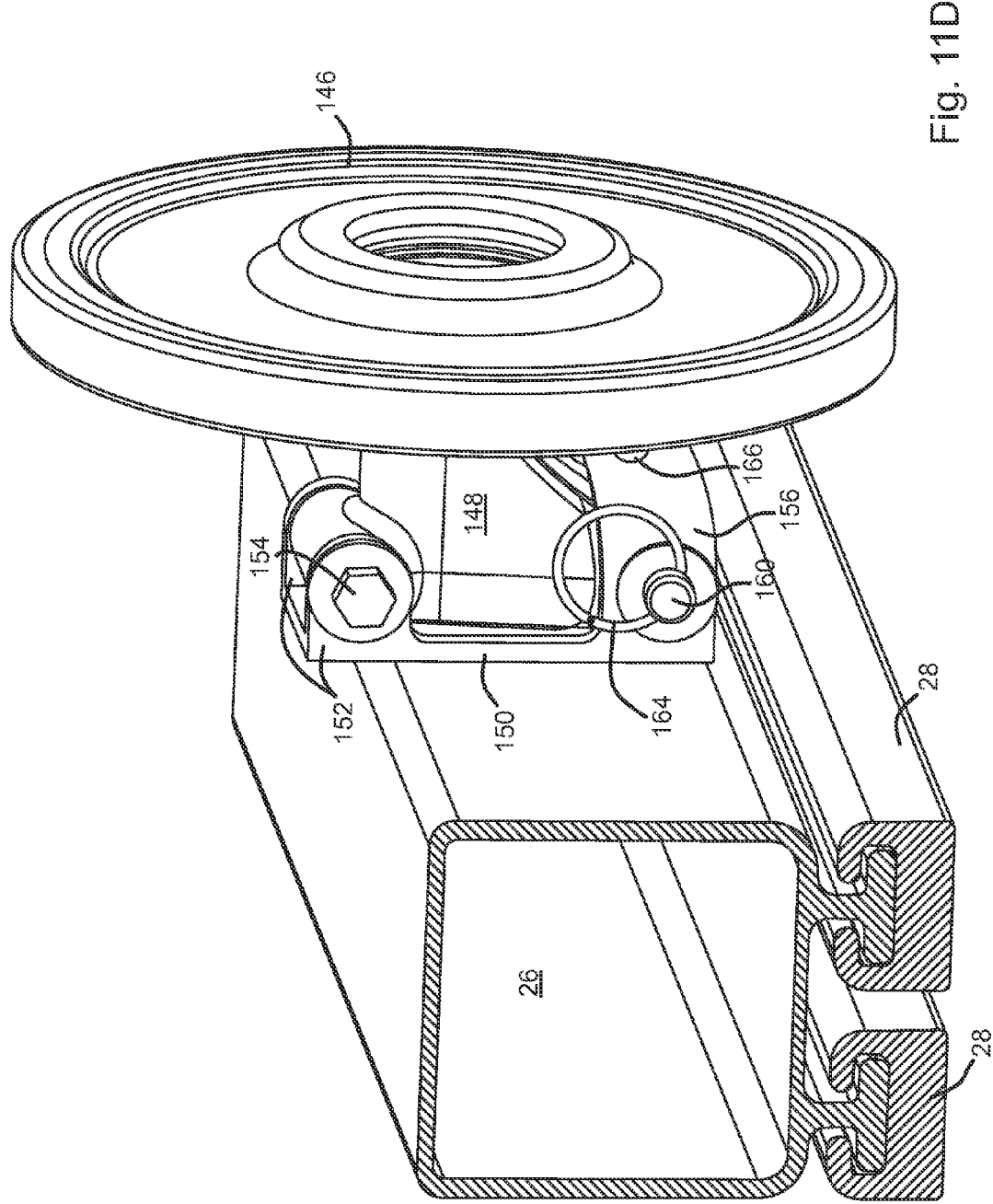

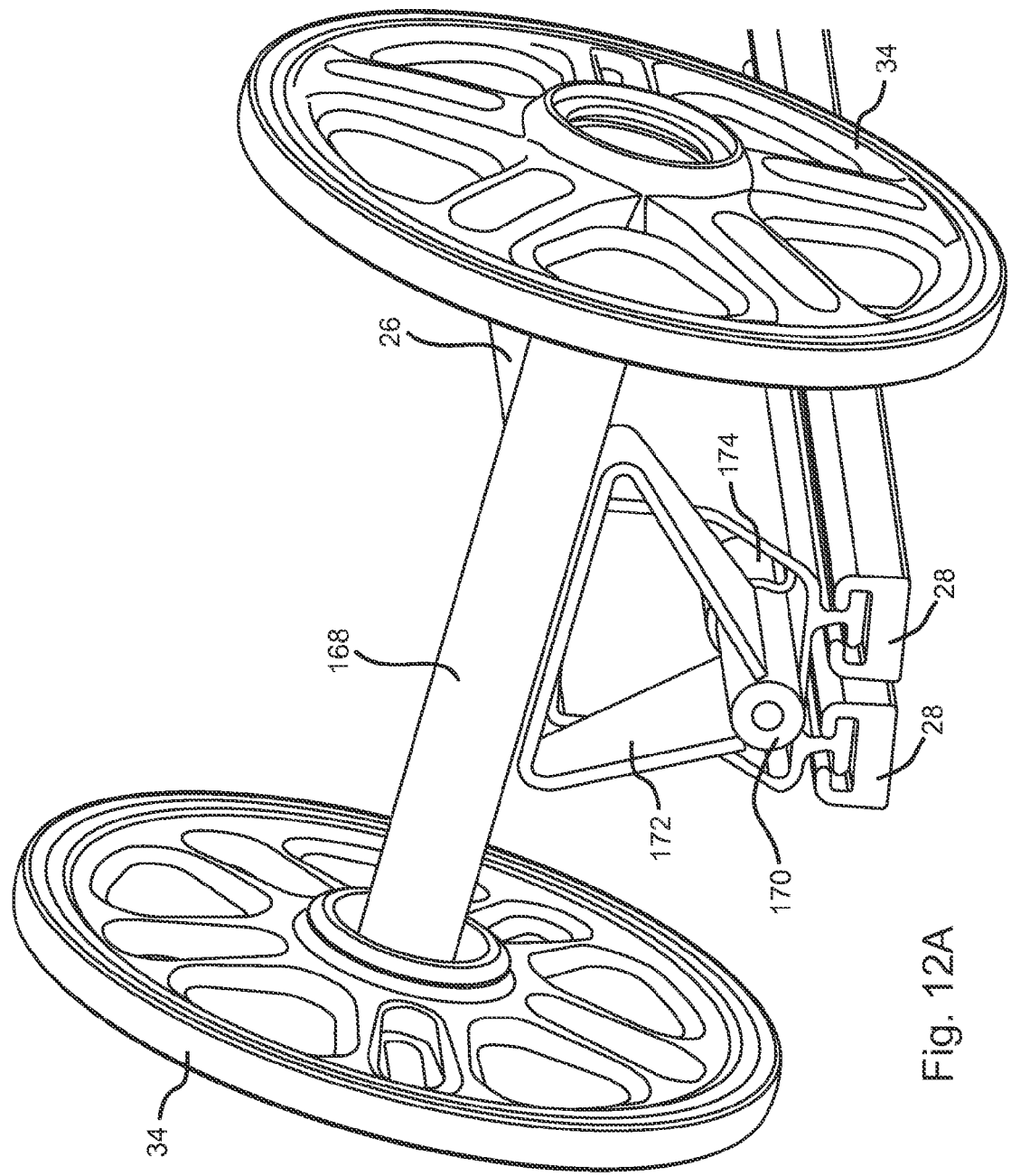

SNOWMOBILE SKID FRAME ASSEMBLY

FIELD OF THE INVENTION

This application relates to snowmobiles and, more particularly, to skid frames for supporting the track of snowmobiles.

BACKGROUND OF THE INVENTION

Snowmobiles travel over snow by means of steerable skis and a track driven by the snowmobile's engine. In order to provide a large surface area in contact with the snow, a skid frame supports the track. The skid frame typically includes a number of idler wheels and a pair of rails offset from one another with wear-resistant material on the lower surfaces thereof. The rails maintain a portion of the track generally flat against the ground. The track may have metal clips with inward-facing smooth surfaces that ride along the wear-resistant material. The skid frame may additionally include a suspension system coupled to the chassis of the snowmobile in order to improve ride quality.

This application is directed to an improved skid frame for a snowmobile that provides improved handling characteristics.

SUMMARY OF THE INVENTION

In one aspect of the invention, a snowmobile includes a chassis including a tunnel. A skid frame is mounted to the chassis below the tunnel and includes a slide surface, a front idler wheel, and a rear idler. The front and rear idler wheels are offset from one another and define a longitudinal direction. The slide surface is generally planar along most of its length and extends along the longitudinal direction between the front idler wheels and the rear idler wheels. A track encircles the skid frame. The tunnel defines a recess having a width sized to receive an upper portion of the track. The slide surface is positioned over a center of the track such that a major longitudinally extending portion of the track that is coextensive with the skid surface has first and second unsupported lateral portions on either side of the skid surface. The first and second unsupported lateral portions each extend in a horizontal direction perpendicular to the longitudinal direction from an edge of the skid surface to an outermost edge of the track and have an extent in the horizontal direction of at least 25 percent of a width of the track.

In another aspect of the invention, the track defines a plurality of windows overlapping the center of the track. The windows have a combined width in the horizontal direction that is substantially equal to a width of the skid surface in the horizontal direction. The track may further include reinforcing members embedded in the track and extending in the horizontal direction between adjacent windows of the plurality of windows. Metal clips may be secured to the track between adjacent windows of the plurality of windows and have an inward facing surface engageable with the skid surface. The inward facing surface may have a width in the horizontal direction substantially equal to the width of the plurality of windows.

In another aspect of the invention, the skid frame includes a longitudinal beam defining a lower surface for receiving at least one wear strip. The longitudinal beam has a width in a horizontal direction perpendicular to the longitudinal axis of the longitudinal beam. Front idler wheel receivers are secured to a first end portion of the longitudinal beam and rear idler wheel receivers are secured to a second end portion of the longitudinal beam. The lower surface extends between the front and rear idler wheel receivers. A frame member has a first mount portion pivotally secured to the longitudinal beam and second mount portions configured to secure to a chassis of a snowmobile. The second mount portions span a mount separation distance in the horizontal direction that is at least twice the width of the longitudinal beam. The first mount portion and longitudinal beam are substantially centered between the second mount portions.

BRIEF DESCRIPTION OF THE DRAWINGS

Preferred and alternative examples of the present invention are described in detail below with reference to the following drawings:

FIG. 8 is a side elevation view of a skid rail in accordance with an embodiment of the present invention;

FIG. 9 is an isometric view of a tensioning system for a skid rail in accordance with an embodiment of the present invention;

FIGS. 10A-10D illustrate a rocking skid rail in accordance with an embodiment of the present invention;

FIGS. 11A-11D illustrate a device for limiting flexing and twisting of a track in accordance with an embodiment of the present invention; and FIGS. 12A-12B illustrate pivoting rear idler wheels in accordance with an embodiment of the present invention.

DETAILED DESCRIPTION OF THE PREFERRED EMBODIMENT

Figure 1:
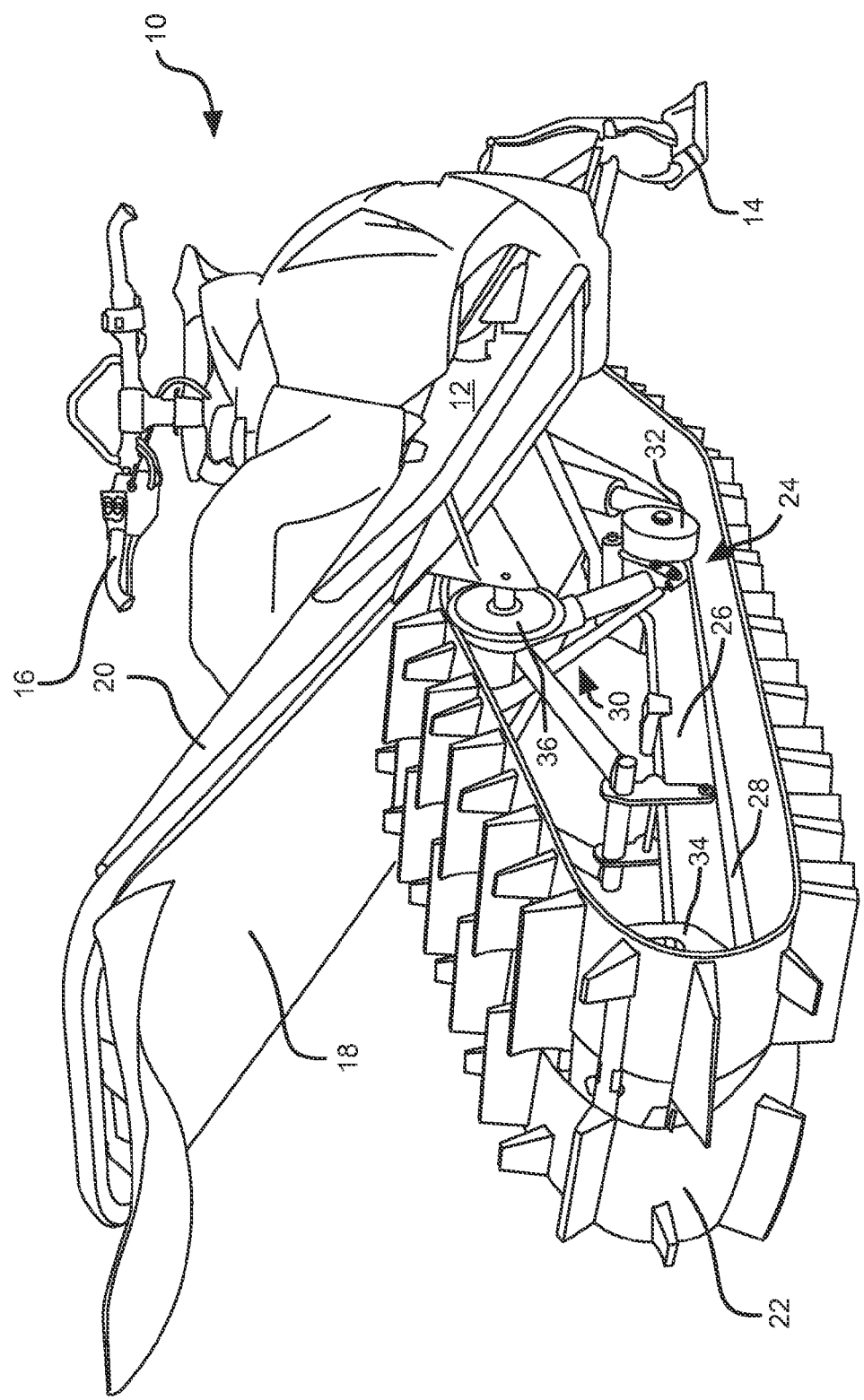
FIG. 1 is a perspective view of a snowmobile in accordance with an embodiment of the present invention.

Referring to FIG. 1, a snowmobile 10 includes a chassis 12 housing an engine. The chassis 12 may have steerable skis 14 (or runners 14) coupled thereto. The skis 14 are coupled to handlebars 16 and are steerable in response to changes in angle of the handlebars 16. A corresponding second ski 14 (not shown) having a mirrored configuration to that of the illustrated ski 14 may be located on an opposite side of the snowmobile 10 and likewise be coupled to the handlebars 16 and steerable thereby. A tunnel 18 is part of the chassis and extends rearwardly with a seat 20 secured to an upper surface thereof. The tunnel 18 defines a space for receiving a portion of a track 22 driven by the engine of the snowmobile 10.

A skid frame assembly 24 is encircled by the track 22. The skid frame both (1) maintains a portion of the track 22 in contact with the ground and (2) provides a suspension 30 for enhancing ride quality of the snowmobile 10. The skid frame assembly 24 may include a skid rail 26 having one or more wear strips 28 secured to a lower surface thereof. The track 22 slides along the wear strips 28. Idler wheels 32, 34 (e.g., front idler wheels 32 and rear idler wheels 34) secure to the skid rail 26 longitudinally offset from one another such that portion of the track 22 between the idler wheels 32, 34 is pressed against a driving surface by the rail 26 and wear strips 28. The idler wheels reduce the friction of the track at bends in the travel of the track as it moves around the skid frame assembly 24. The portion of the skid rail 26 between the idler wheels 32, 34 may have a substantially flat lower surface, e.g. deviate vertically from a straight line extending between the idler wheels 32, 34 by less than 5 percent, preferably less than 1 percent, of the distance between the idler wheels 32, 34. Other idler wheels, such as the upper idler wheel 36 guide the track over the suspension arms and maintain tension in the track 22 in response to compression of the suspension 30. For purposes of this disclosure, unless otherwise noted, the word "substantially" may mean "within 5 percent of," preferably "within 1 percent of."

Figure 2:
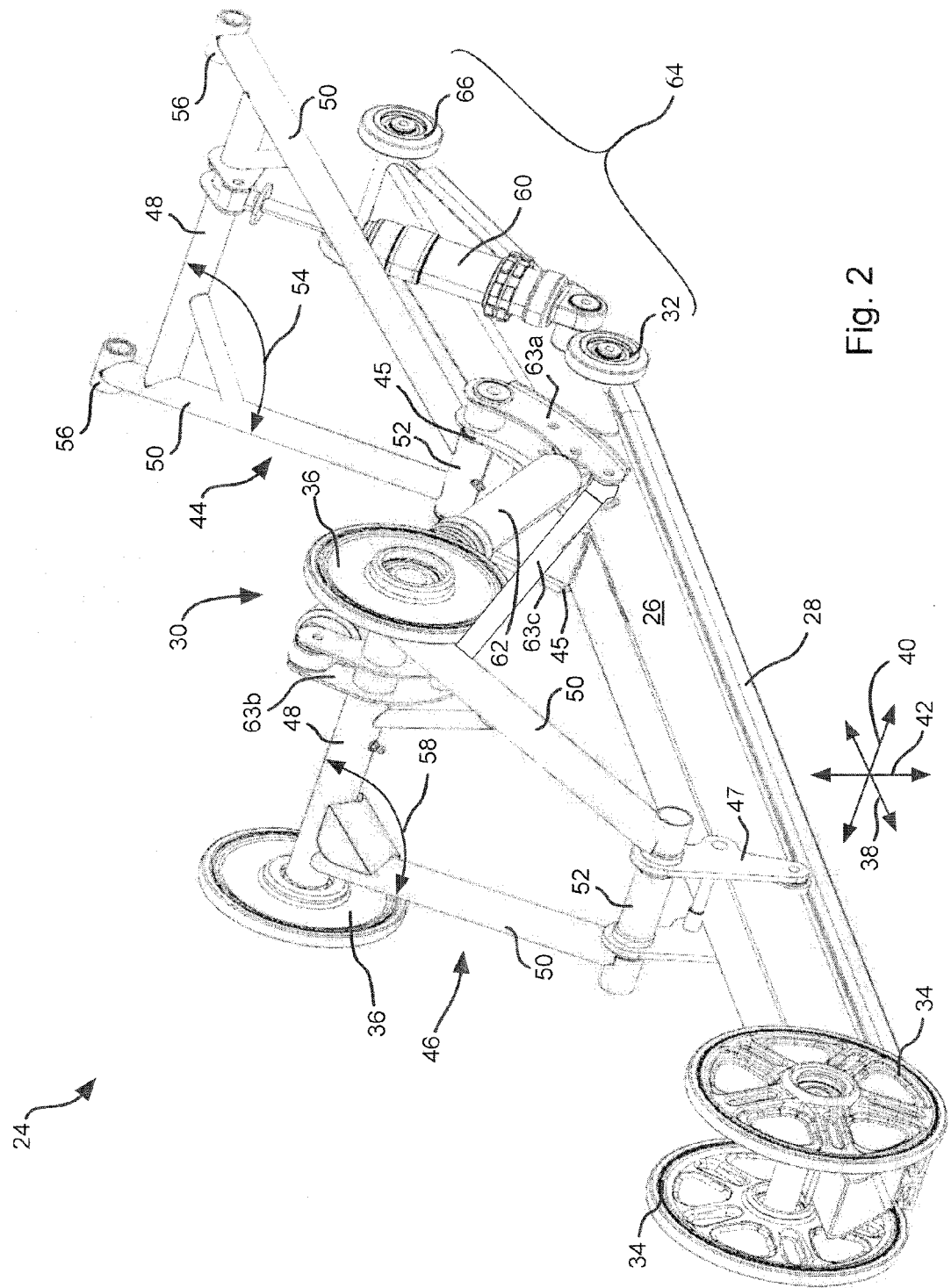
FIG. 2 is an isometric view of a skid frame assembly in accordance with an embodiment of the present invention.

FIG. 2 illustrates an exemplary skid frame assembly 24. The skid frame assembly 24 may be understood with respect to a longitudinal direction 38 that generally corresponds to a direction of travel of the snowmobile 10, the direction that the track slides along the wear strip 28, or a line passing through the idler wheels 32, 34. A horizontal direction 40 may be defined as perpendicular to the longitudinal direction 38 and parallel to a lower surface of the wear strip 28 or a surface over which the snowmobile 10 is traveling. A vertical direction 42 may be defined as being perpendicular to the longitudinal direction 38 and horizontal direction 40.

The suspension 30 of the skid frame assembly 24 may include a front arm 44 (e.g., suspension arm member) and a rear arm 46, also referred to as an idler arm 46. The front and rear arms 44, 46 may each include an upper horizontal member 48, vertical supports 50 extending downwardly from the upper horizontal member 48, and a lower horizontal member 52 secured to lower end portions of the vertical supports 50. As is apparent in FIG. 2, the vertical supports 50 span the vertical extent between the upper horizontal members 48 and the lower horizontal members 52 but are not necessarily themselves parallel to the vertical direction 42. The lower horizontal member 52 may pivotally mount to the skid rail 26. In the illustrated embodiment, the front arm 44 pivotally secures to the skid rail 26 by means of an intervening member such as by pivotally securing to one or more brackets 45 rigidly secured to the skid rail and extending vertically above the skid rail 26. Likewise, the idler arm 46 may be secured to the skid rail 26 by pivotal securement to a rear arm 47 that is pivotally or rigidly secured to the skid rail 26. As shown in FIG. 2, the vertical supports 50 of the front arm 44 define an included angle 54 with respect to the upper horizontal member 48. The included angle 54 is less than 90 degrees, preferably less than 80 degrees, and more preferably less than 70 degrees. As described in greater detail below, the skid rail 26 and wear strip 28 are substantially narrower than the track 22 and the tunnel 18. Accordingly, acute angle 54 is effective to span the difference between the width of the tunnel 18 and the width of the track 22. The vertical supports 50 may have tunnel mounts 56 secured to upper end portions thereof for securing to the tunnel 18 or some other portion of the chassis 12.

The vertical supports 50 of the rear idler arm 46 may likewise define an acute angle 58 with respect to the upper horizontal member 48. The idler wheels 36 may be coupled to the upper horizontal member 48. The separation between the idler wheels 36 may be smaller than a width of the tunnel 18. Accordingly, the angle 58 may be less acute than the angle 54.

The front arm 44 may be coupled to the skid rail 26 by means of a shock absorber 60 that resists rotation of the front arm 44. Likewise, the idler arm 46 may be coupled to the skid rail 26 by means of shock absorber 62 that resists rotation of the idler arm 46. For example, the shock absorber 62 may be pivotally secured at one end to a rocker arm 63a that is pivotally mounted to the skid rail 26. The rocker arm 63a may pivotally mount directly to the skid rail 26 or by means of pivotal securement to lower horizontal member 52 of the front arm 44, e.g. to an outboard end thereof. The shock absorber 62 may be pivotally secured at an opposite end to a rocker arm 63b pivotally secured to the upper horizontal member 48 of the idler arm 46. A link 63c, e.g. rod, may also be pivotally secured to the rocker arm 63a and the rocker arm 63b. As shown, the shock absorber 62 is pivotally secured to the rocker arm 63a between the points of securement of the link 63c and the lower horizontal member 52 to the rocker arm 63a. For the upper rocker arm 63b, the point of securement to the upper horizontal member 48 is between points of securement of the link 63c and the shock absorber 62 to the rocker arm 63b. As shown in FIG. 2, due to the narrowness of the skid rail 26 and its vertical extent, the shock absorbers 60, 62 may be positioned to one side of the skid rail 26. Likewise, the rocker arms 63a, 63b, and link 63c may be located on the same side of the skid rail 26. The illustrated configuration of the suspension 30 is merely illustrative. Various other suspension 30 configurations may also be used with the skid rail 26 configuration described herein.

In some embodiments, the skid rail 26 has a forward end portion 64 that is one or both of tapered and tilted upward with respect to the remainder of the skid rail. Other than the forward end portion 64, the skid rail 26 may have a constant cross section, such as a rectangular box beam shape. In the illustrated configuration, anti-stab wheels 66 secure to the forward end portion 64.

Figure 3:
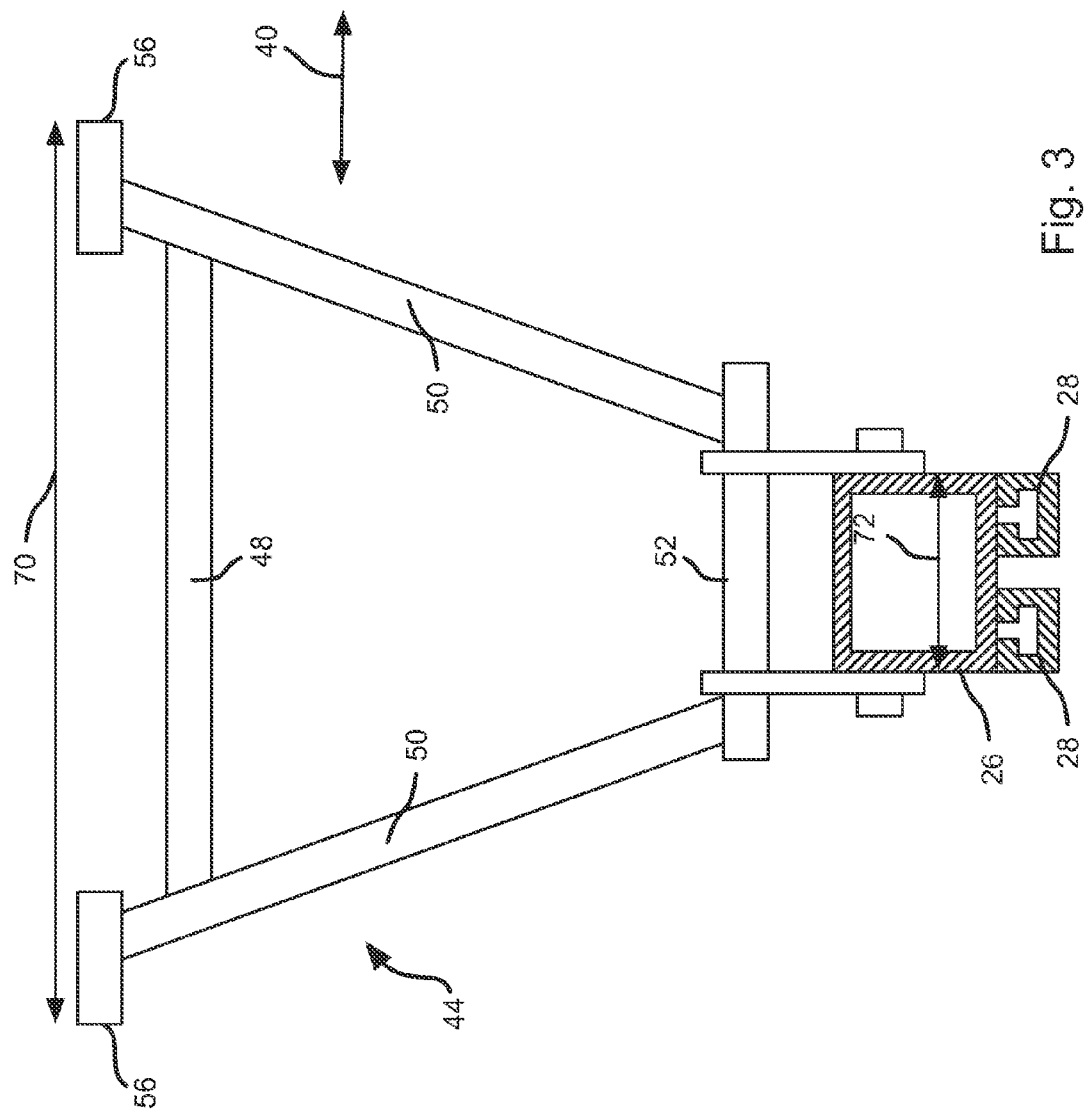
FIG. 3 is a rear-elevation view of a front suspension arm secured to the rail in accordance with an embodiment of the present invention.
Figure 4:
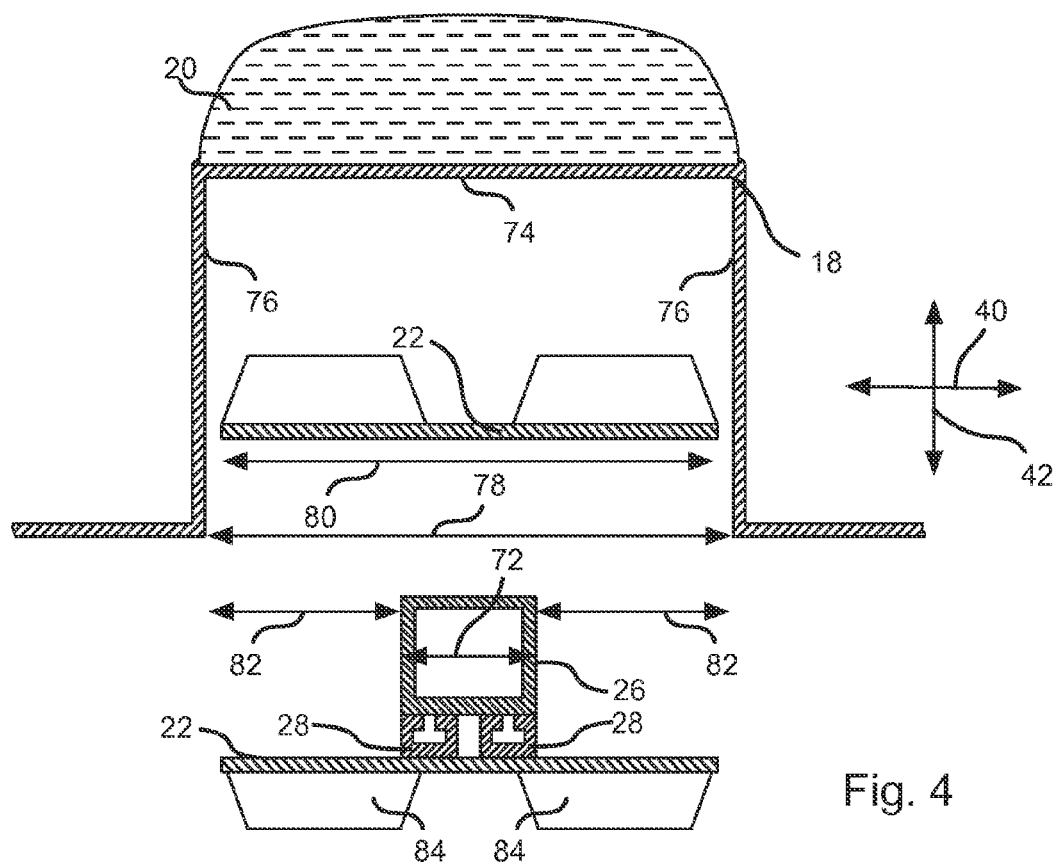
FIG. 4 is a cross-sectional view of a snowmobile chassis in accordance with an embodiment of the present invention.

Referring to FIG. 3, the forward arm 44 may define a spanning distance 70 between outer faces of the tunnel mounts 56 (e.g., tubes in the embodiment of FIG. 2. Likewise, the skid rail 26 may define a width 72. The width 72 may be the width of the box beam forming the skid rail 26 or a distance between the outermost edges of a wear strip 28 or a set of wear strips 28 secured to the skid rail. In some embodiments, the distance 70 is at least twice the distance 72, preferably at least three times the distance 72. In some embodiments, the distance 70 is no more than four times the distance 72. Referring to FIG. 4, the tunnel 18 may have a generally rectangular cross-sectional shape including a top surface 74 supporting the seat 20 and side panels 76 extending downwardly from the top surface. In some embodiments, the side panels 76 are perpendicular to the top panel 74. In other embodiments, the side panels 76 may flare outwardly. The tunnel 18 may define a width 78 sized to receive the track 22, i.e. greater than a width 80 of the track 22 plus some tolerance for sway in the track 22. For purposes of FIG. 4, widths are widths measured along the horizontal direction 40. The width 78 may be defined as the narrowest width of the tunnel that is longitudinally adjacent a portion of the track 22 at some point during operation. For example, the width 78 for a flared tunnel 18 may be the distance in horizontal direction 40 between the side panels 76 at the top panel 74.

The rail width 72 as defined above may be substantially less than the width 80 of the track. For example, the skid rail 26 may be positioned over the centerline and a portion of the track 22 may extend unsupported by the skid frame on either side of the skid rail 26 and the wear strip 28, or wear strips 28. The extent 82 of the unsupported portion on one side of the track may be at least 25 percent of the entire width of the track 22, preferably 30 percent, and more preferably 35 percent. The extent 82 of one side of the unsupported portion of the track 22 may be defined as a right or left portion of the track 22 extending outwardly from an outermost portion of the wear strips 28 (or single wear strip) in contact with the track 22 when the snowmobile 10 is positioned on a flat surface. Accordingly, the distance 72 between outward edges of the wear strips 28, or of a single wear strip when only one wear strip is used (e.g. see FIG. 7B), may be less than 50 percent, preferably less than 40 percent, and more preferably less than 30 percent, of the track width 80.

In some embodiments, the distance 72 is at least 50 percent of the width of the track 22, preferably 35 percent, and more preferably 25 percent. The unsupported portion may extend along a major portion, preferably substantially all of the track 22 extending in the longitudinal direction 38 between the idler wheels 32, 34 (See FIGS. 1 and 2). The unsupported portion may be completely unsupported and may not engage any other structure that would prevent flexing and twisting of the track 22. In some embodiments, the unsupported portion may be completely unsupported and not engage any other structure for some angular distance, e.g. at least 5 degrees, preferably 10 degrees, at which point some structure may prevent or hinder further flexing and/or twisting of the track 22.

Figure 5A:
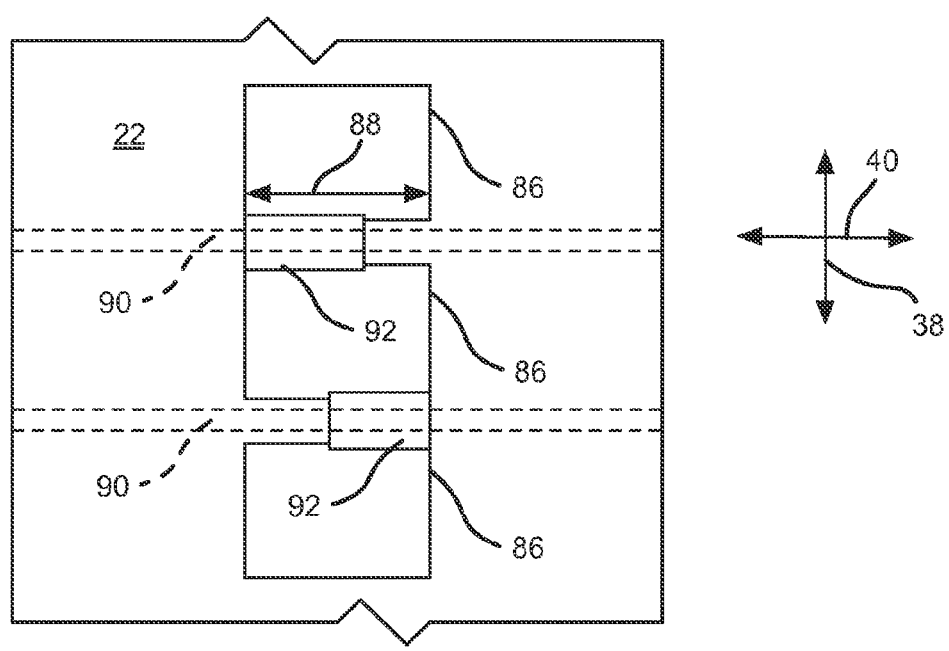
FIG. 5A is a top plan view of a portion of an inward facing surface of a snowmobile track in accordance with an embodiment of the present invention.
Figure 5B:
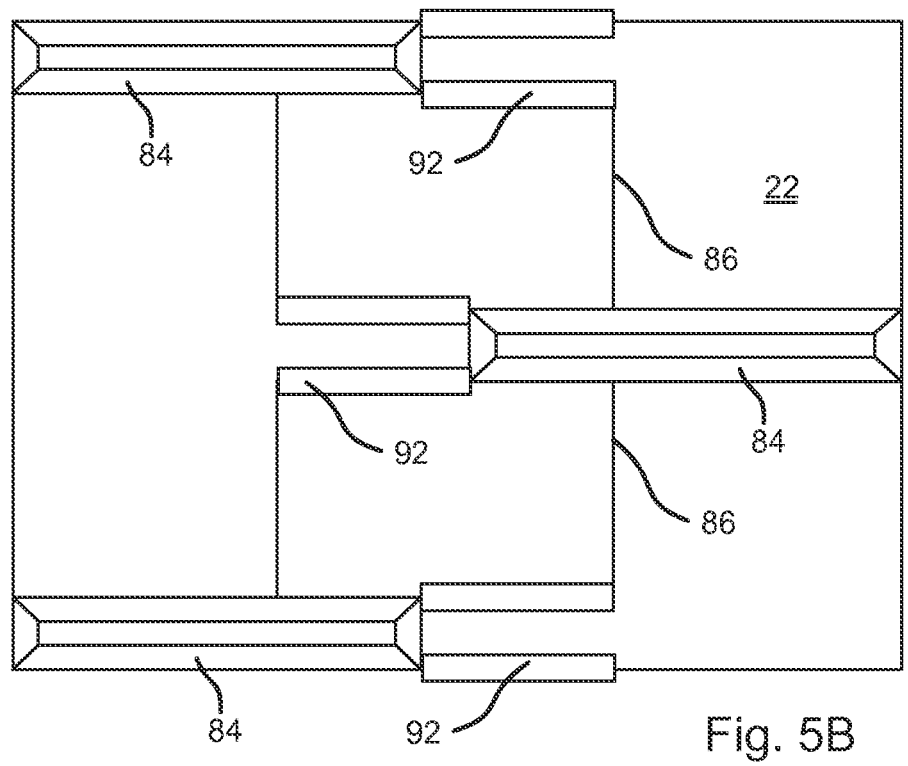
FIG. 5B is a top plan view of a portion of an outward facing surface of a snowmobile track in accordance with an embodiment of the present invention.
Figure 5C:
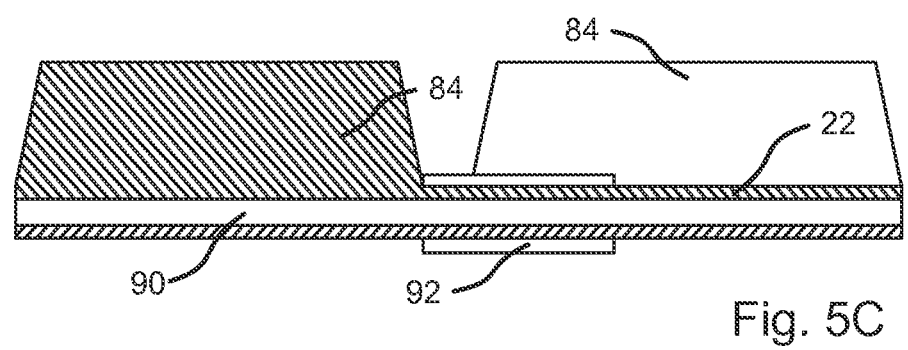
FIG. 5C is a front cross-sectional view of a snowmobile track in accordance with an embodiment of the present invention.

Referring to FIGS. 5A to 5C, while still referring to FIG. 4, the track 22 may have lugs 84 secured thereto to improve traction with snow. The lugs 84 may be positioned on either side of windows 86 cut through the track 22 periodically along the centerline of the track 22. In some embodiments, the lugs 84 extend in the horizontal direction 40 partially across the windows 86 as apparent in FIG. 5B. The centerline of the track is a line located at the center of the track as measured along the horizontal direction 40. The centerline of the track extends through the windows 86. The windows 86 may serve to allow snow to pass through the track 22 in order to cool the one or more wear strips 28. The windows 86 may have a width 88 in horizontal direction 40 that is comparable to the width 72. For example, the width 88 may be +/−10 percent, preferably 5 percent, more preferably 1 percent, of the width 72. Portions of the track 22 between the windows 86 may have reinforcing members 90 embedded therein. The reinforcing members 90 may include, for example, fiberglass, metal, plastic, or some other material. The reinforcing members 90 resist flexing of the track while still allowing some flexing and urge the track 22 to both twist and flex in response to unbalanced loading.

The portions of the track 22 between the windows 86, including the embedded reinforcing members 90, may be partially or completely surrounded by clips 92. The clips 92 may be formed of metal or other low friction material. An inward facing surface of the clips 92 engages the wear strips 28 and reduces wear and friction due to sliding of the track 22 over the wear strips 28. The width 88 may be selected such that the clips 92 extend completely or substantially completely across the wear strips 28, or set of wear strips 28. The clips 92 may extend completely or substantially completely across the window 86. As shown in FIGS. 5A through 5C, the clips 92 preferably have a staggered configuration and extend partially across the window 86, such that a clip 92 around one rod 90 is positioned closer to one side of the window 86 whereas the clip 92 on an adjacent rod 90 is positioned closer to an opposite side of the window 86. This staggered configuration may advantageously accommodate or facilitate a similar staggered arrangement of the lugs 74 extending partially across the window 86 as shown in FIG. 5B. As shown in FIG. 5B, one lug 84 may be positioned on one side of the row of windows 86 and extend partially across the width of the windows 86 from that side whereas an adjacent lug 84 may be positioned on an opposite side of the rows of windows 86 and extend partially across the width of the windows 86 from that side.

Figure 5D:
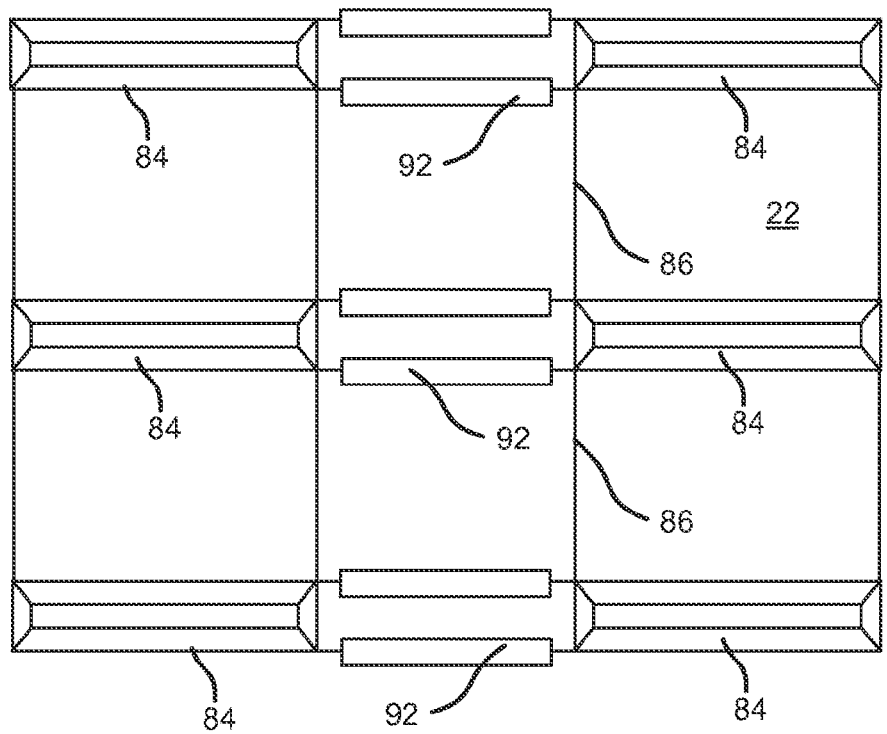
FIG. 5D is a top plan view of an outward facing surface of an alternative embodiment of a snowmobile track in accordance with an embodiment of the present invention.

Referring to FIG. 5D, in some embodiments, the windows 86 and clips 92 may be substantially centered with respect to a width of the track 22. The clips 92 may extend parallel to the width of the track such that at least 50 percent, preferably at least 75 percent, and more preferably 100 percent, of the widths of the lower surfaces of the wear strips 28 contact the clips 92 as the track passes under the wear strips.

Figure 5E:
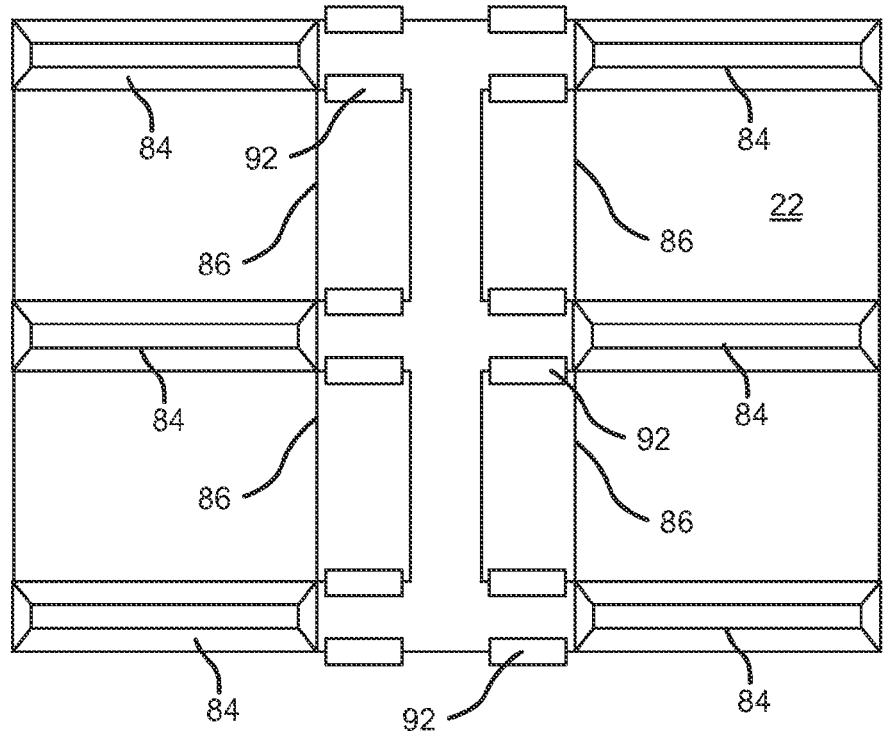
FIG. 5E is a top plan view of an outward facing surface of another alternative embodiment of a snowmobile track in accordance with an embodiment of the present invention.

Referring to FIG. 5E, in another embodiment, parallel rows of windows 86 are defined by the track 22 and corresponding parallel rows of clips 92 are coupled to the track between contiguous windows of each row. The separation between the windows 86 and clips 92 along the width of the track 22 may correspond to a separation of the wear strips 28 in embodiments having two or more wear strips 28. The rows of windows 86 and clips 92 may be positioned such that each clip 92 contacts a wear strip 28 along at least 50 percent, preferably at least 75 percent, and more preferably 100 percent, of the width of that wear strip 28 as the track runs under the wear strip.

Figure 6A:
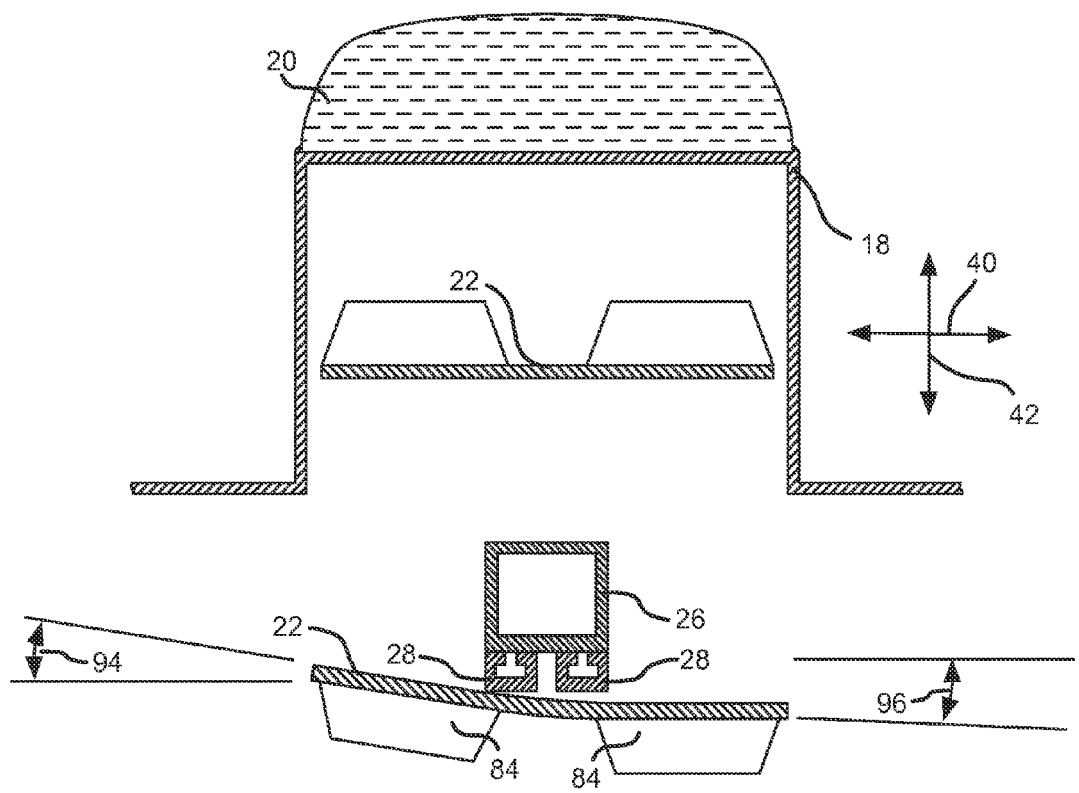
FIGS. 6A and 6B are cross-sectional views of a snowmobile chassis during side-hill operation in accordance with an embodiment of the present invention.

Referring to FIG. 6A, the configuration of the skid rail 26 and wear strips 28 with respect to the width of the track 22 may facilitate handling of the snowmobile. For example, when riding along a hill, it may be advantageous to drive with one ski (the uphill ski) engaged with the snow and the other ski (the downhill ski) elevated above the snow. However, it can be a difficult maneuver to tip the snowmobile to its uphill side. Furthermore, this orientation can be difficult to maintain while maneuvering up, down, or around obstacles. To do so, the orientation of the snowmobile relative to the hillside may need to be constantly adjusted. In some situations, the track 22 may not be sufficiently engaged with the snow to maintain forward movement of the snowmobile sufficient to maintain the snowmobile in this orientation.

The configuration described herein for the skid rail 26 and wear strips 28 enables flexing and/or twisting of the track 22 when riding along a slope. In this situation, the uphill side of the track 22 will flex upwardly by an angle 94. The downhill side of the track 22 may also flex downwardly by an angle 96. The angle 96 may be less than the angle 94 due to flexing of the track 22. In this manner, a greater area of the track 22 and lugs 84 are maintained in contact with the snow. The small tipping adjustments of the snowmobile relative to the slope may also be more easily accomplished as the tipping is less abrupt relying on some track twist and some track flex rather than just pivoting about an uphill rail of a conventional skid frame.

Figure 6B:
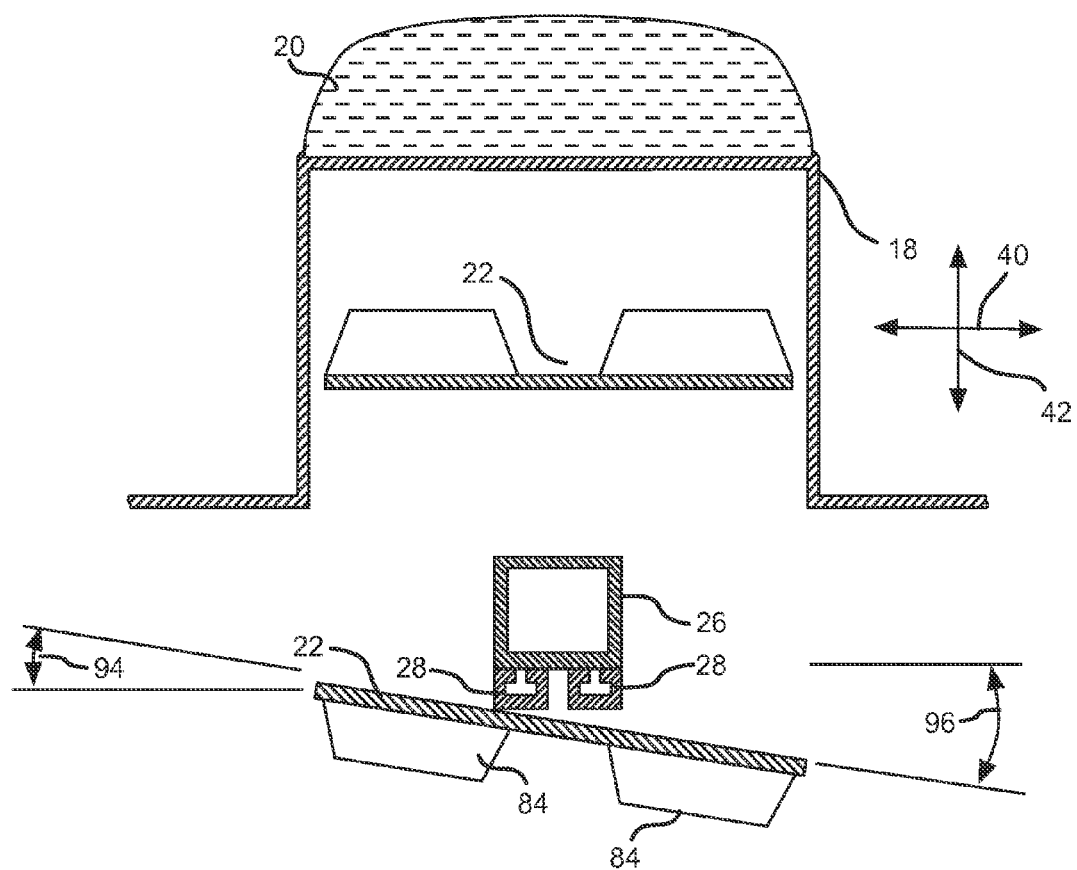

Referring to FIG. 6B, in some instances or embodiments, the track 22 may not substantially flex or bend during side hill use as shown. In such embodiments, the stiffness of the track 22 may be such that the angles 94, 96 for a portion of the track 22 may be substantially equal, e.g. within +/−10%, preferably within +/−5%, of equal to one another. This also depends on the slope of the side hill, the tightness of the track and the ability of any idler wheels to flex or follow the twisting of the track. In such instance with minimal track bending, the track is able to more closely follow the contour of the slope. This may lead to positive forward traction and even lateral traction, along with improved maneuverability.

Figure 7A:
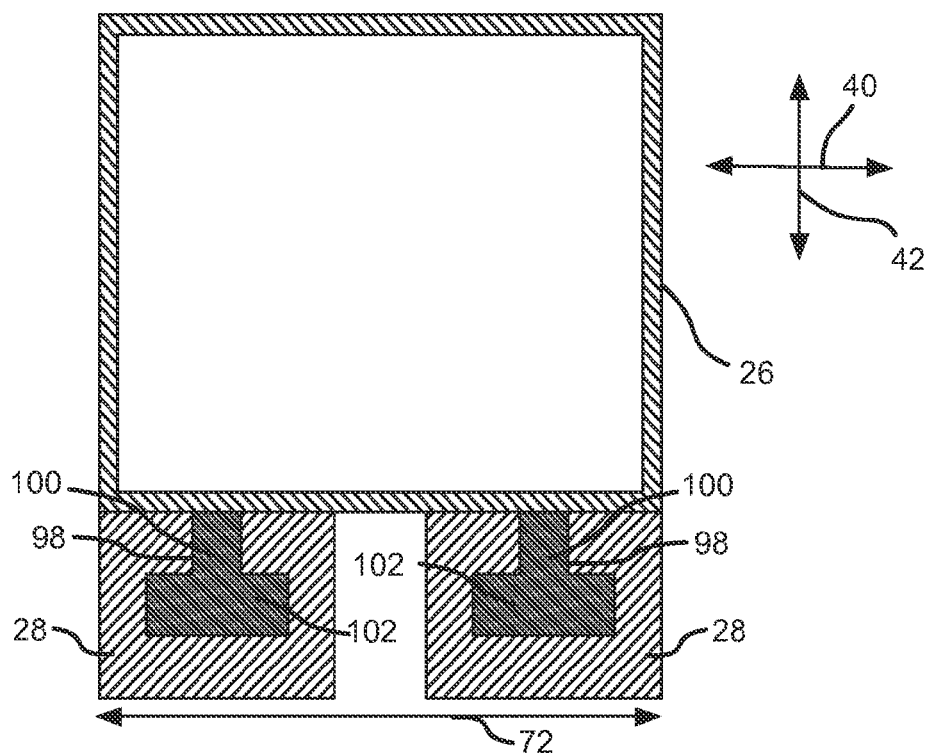
FIGS. 7A-7I are cross-sectional views of a skid rail and wear strips of a skid frame in accordance with an embodiment of the present invention.

Referring to FIG. 7A, in some embodiments, a skid rail 26 according to the embodiments described herein may have two or more wear strips 28 defining a skid surface. In such embodiments, the distance 72 may be defined as the distance between the outermost edges of the outermost wear strips 28. In some embodiments, the width of the skid rail is substantially equal to the distance 72. In some embodiments, the wear strips 28 may define a channel 98 and the skid rail 26 may have one or more rails 100 (e.g., wear strip receivers) extending longitudinally along the lower surface thereof. The rails 100 may have a widened end portion 102. The channel 98 receives the rail 100 and the widened portion 102 retains the wear strip 28 within the channel 98. The configuration of FIG. 7A advantageously allows a skid rail 26 according to the embodiments described herein to use wear strips 28 for conventional snowmobiles.

Figure 7B:
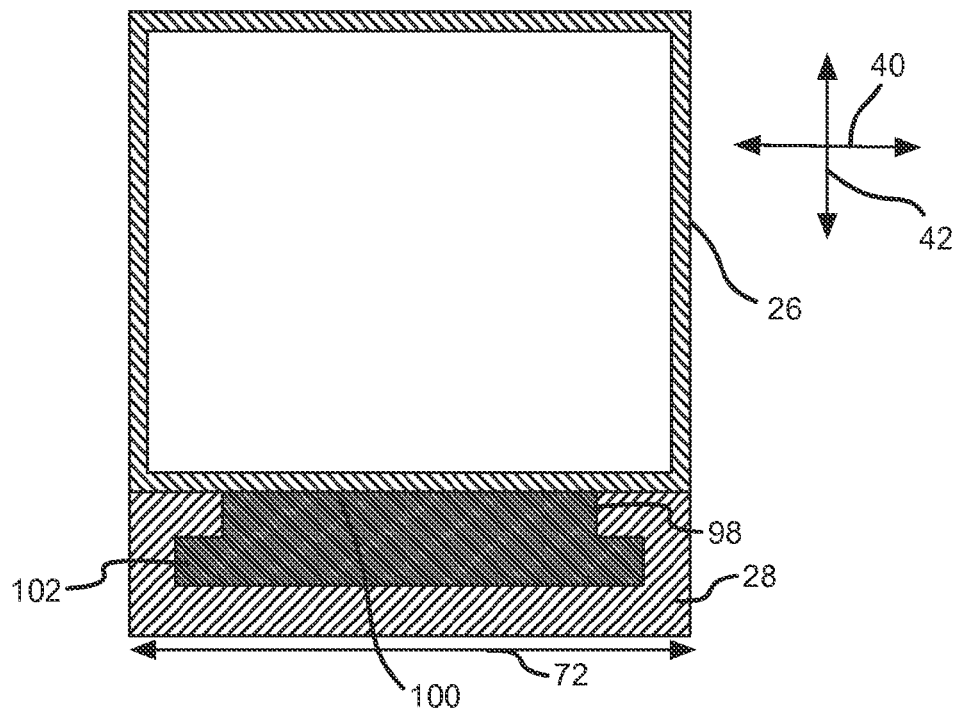
Figure 7C:
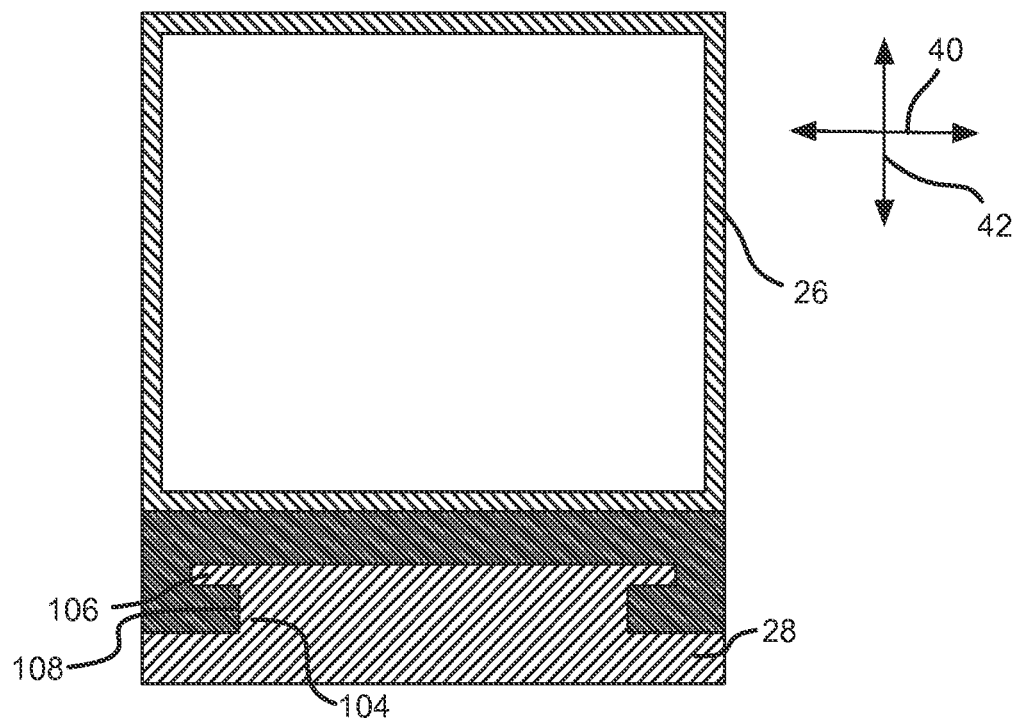

Referring to FIG. 7B, in still other embodiments, a single wear strip 28 spans the entire distance 72. Accordingly, a single rail 100 (e.g., wear strip receiver) with a widened end portion 102 may be received within a channel 98 defined by such a wear strip 28. Due to the width of the wear strip 28, fasteners may additionally or alternatively be used to secure the wear strip 28 to the skid rail 26. Referring to FIG. 7C, in another alternative embodiment, a wear strip 28 defines a rail 104 with a widened end portion 106 that is received within a channel 108 (e.g., wear strip receiver) defined by or secured to the skid rail 26.

Figure 7D:
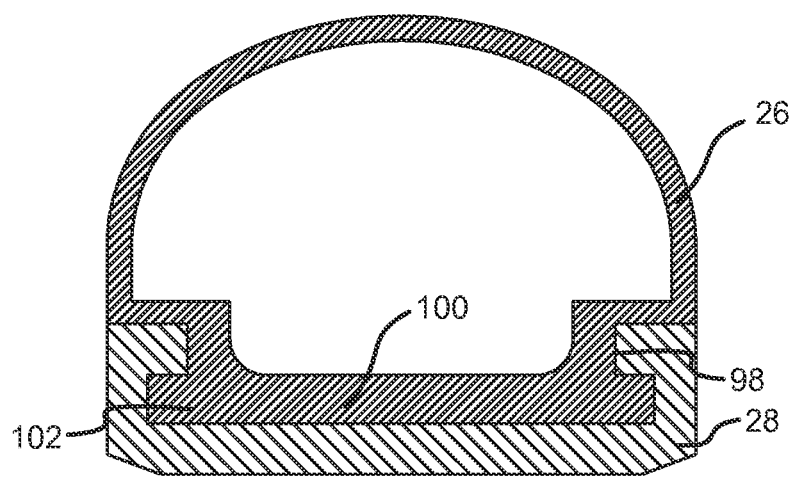
Figure 7E:
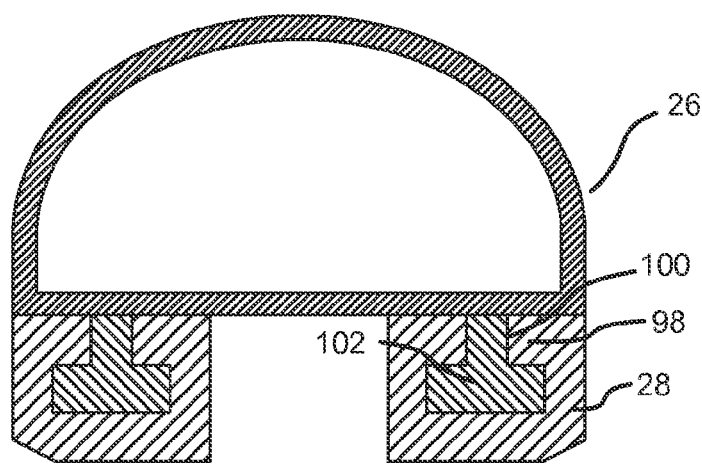
Figure 7F:
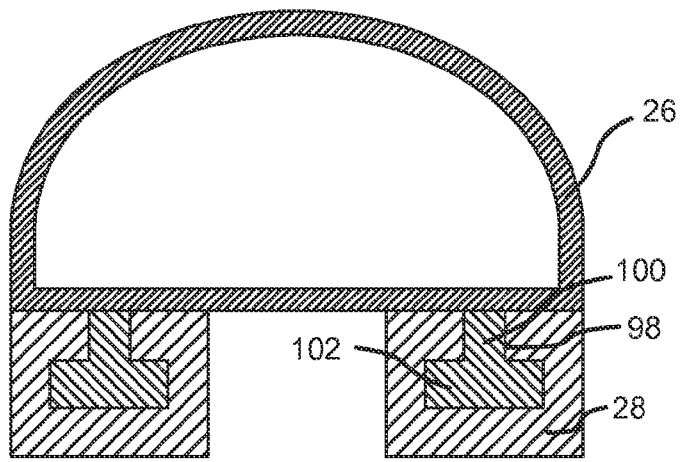
Figure 7G:
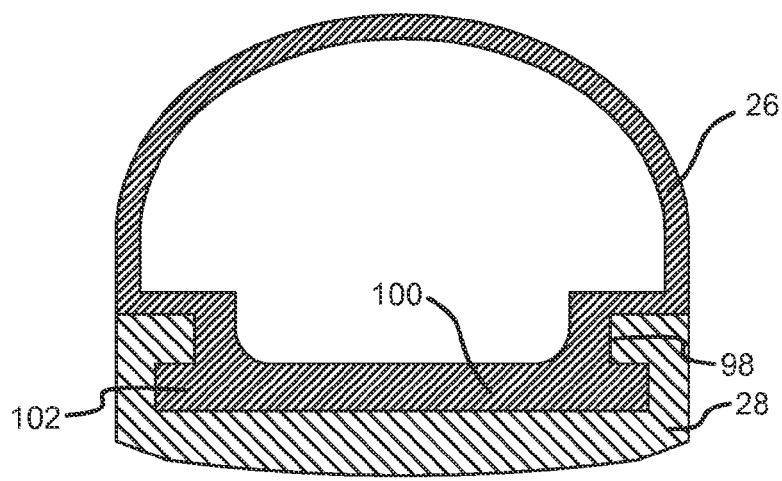

Although the skid rail 26 as shown has a rectangular box beam configuration, other cross sectional shapes may also be used. For example, the skid rail 26 beam may have a generally semi-circular-shaped portion and have a wear strip 28 mounted to a planar lower surface and a rounded upper surface as shown in FIG. 7D. The wear strip 28 of FIG. 7D may be securable to the skid rail 26 in the same manner as for FIG. 7B or 7C or some other means. In the embodiment of FIG. 7D the rail 100 for mounting the wear strip 28 is monolithically formed (preferably by extrusion) with the skid rail 26 beam. However, the rail 100 may be securable to the skid rail 26 by some other means such as fasteners, welds, or the like. As apparent in FIG. 7D, the lower surface of the wear strip 28 has a curved or convex configuration. The lower surface of the wear strips 28 of FIGS. 7B and 7C may be similarly curved in some embodiments. In embodiments having one or more wear strips 28, one or more of the wear strips may be curved or otherwise define a portion of a concave surface. As shown in FIG. 7E, a skid rail 26 with a rounded upper surface, or other cross-sectional shape, may be used with a pair of wear strips 28 and corresponding mounting rails 100 as for other embodiments disclosed herein. The outward facing edges of the two or more wear strips 28 may be curved or chamfered to facilitate twisting and/or bending of a track engaging the two or more wear strips 28. As shown in FIG. 7F, in other embodiments, the two or more skid rails 28 have planar lower surfaces instead, without chamfering or rounding. As shown in FIG. 7G, a skid rail 26 having a square, rounded, or other cross section may have a single wear strip secured thereto in a similar manner to FIG. 7B or FIG. 7C. The wear strip may define a convex lower surface to facilitate twisting and/or flexing of the track 22 engaged thereby. The convex shape may be defined by one or both of chamfering or rounding at outer edges thereof and by a continuously contoured or rounded lower surface having a constant (e.g. circular) or varying (e.g. elliptical) radius of curvature.

Figure 7H:
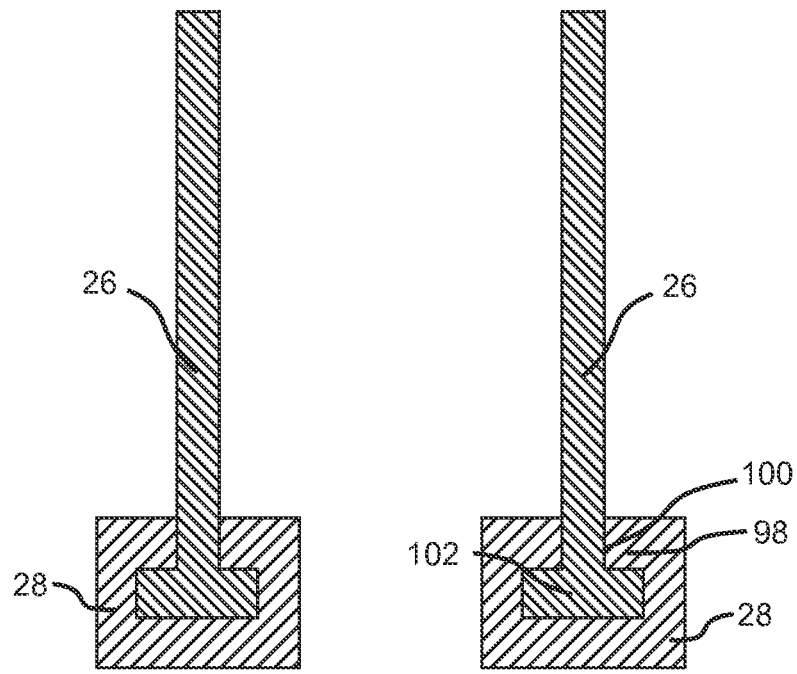

In still other embodiments, the skid rail 26 may be embodied as two rails each having a wear strip 28 mounted thereto such as are used in a conventional snowmobile as shown in FIG. 7H. The two rails may be positioned close together such that the wear strips have the relationship to one another as for other embodiments disclosed herein. In such embodiments, the two rails may have supportive braces between them.

Figure 7I:
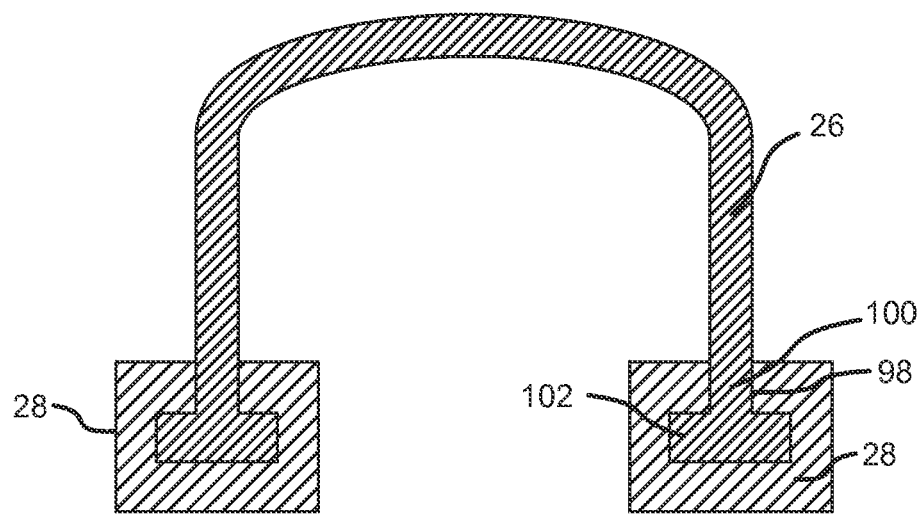

In some embodiments, the skid rail 26 has an open box beam shape, e.g. inverted U-shape, such that one wall thereof is removed as shown in FIG. 7I. In such an embodiment, the wear strips 28 may mount to exposed edges of the open box beam. In such embodiments, the two rails may have supportive braces between them. For any of the embodiments of FIGS. 7A through 7H, the skid rail 26 and structures engaging the variously embodied wear strips 28 may be co-extruded.

Referring to FIG. 8, as viewed from the side, the skid rail 26 is generally straight along the longitudinal direction 38. The skid rail 26 may advantageously be substantially straight along a major portion of the longitudinal extent thereof, e.g. between 75 and 80 percent of the length thereof. As noted above, a front-end portion 64 of the skid rail may slope upwardly and may also taper in a plane parallel to the longitudinal direction 38 and vertical direction 42. The wear strip 28 may extend along substantially the entire lower surface of the skid rail 26, including the front-end portion 64.

Referring to FIG. 9, in some embodiments, the track may be tensioned by adjusting a relative position of the rear idler wheels 34 to the skid rail 26. For example, a tensioning system 110 may be interposed between the rear idler wheels 34 and the skid rail 26. In the illustrated embodiment, the tensioning system 110 includes a rear tensioning body 114 that includes rear idler wheel receivers 200 having the idler wheels 34 pivotally mounted thereto and a front tensioning body 112 that mounts to an upper surface of the skid rail 26. The rear tensioning body 114 defines slots 116 positioned along opposing lateral surfaces (e.g. vertically and longitudinally extending surfaces) of the skid rail 26 and extending in the longitudinal direction 38. The tensioning system 110 may be symmetric such that a corresponding slot 116 may be positioned on an opposite side of the skid rail 26 and have a mirrored configuration to the illustrated slot 116. The rear tensioning body 114 may be secured to the skid rail 26 by means of fasteners 118 positioned within the slots and tensioned and positioned such that sliding movement of the fasteners 118 within the slots 116 is permitted.

The front tensioning body 112 may define a longitudinally extending aperture 120 that receives a threaded fastener 122, e.g. bolt having one end bearing against the rear tensioning body 114. The aperture 120 may be threaded such that rotation of the fastener 120 will urge the fastener 122 longitudinally relative to the front tensioning body 112. The rear tensioning member 114 will therefore be constrained to move relative to the front tensioning body 112 and skid rail 26 in response to this rotation, thereby adjusting the tension in the track of the snowmobile.

Alternatively, the rear idler wheels (or a single rear idler wheel) may be situated between rail sides, instead of outboard of the rail sides. For this purpose, the rail may be split or have an opening for the wheel(s) at its rearward end.

Figure 10C:
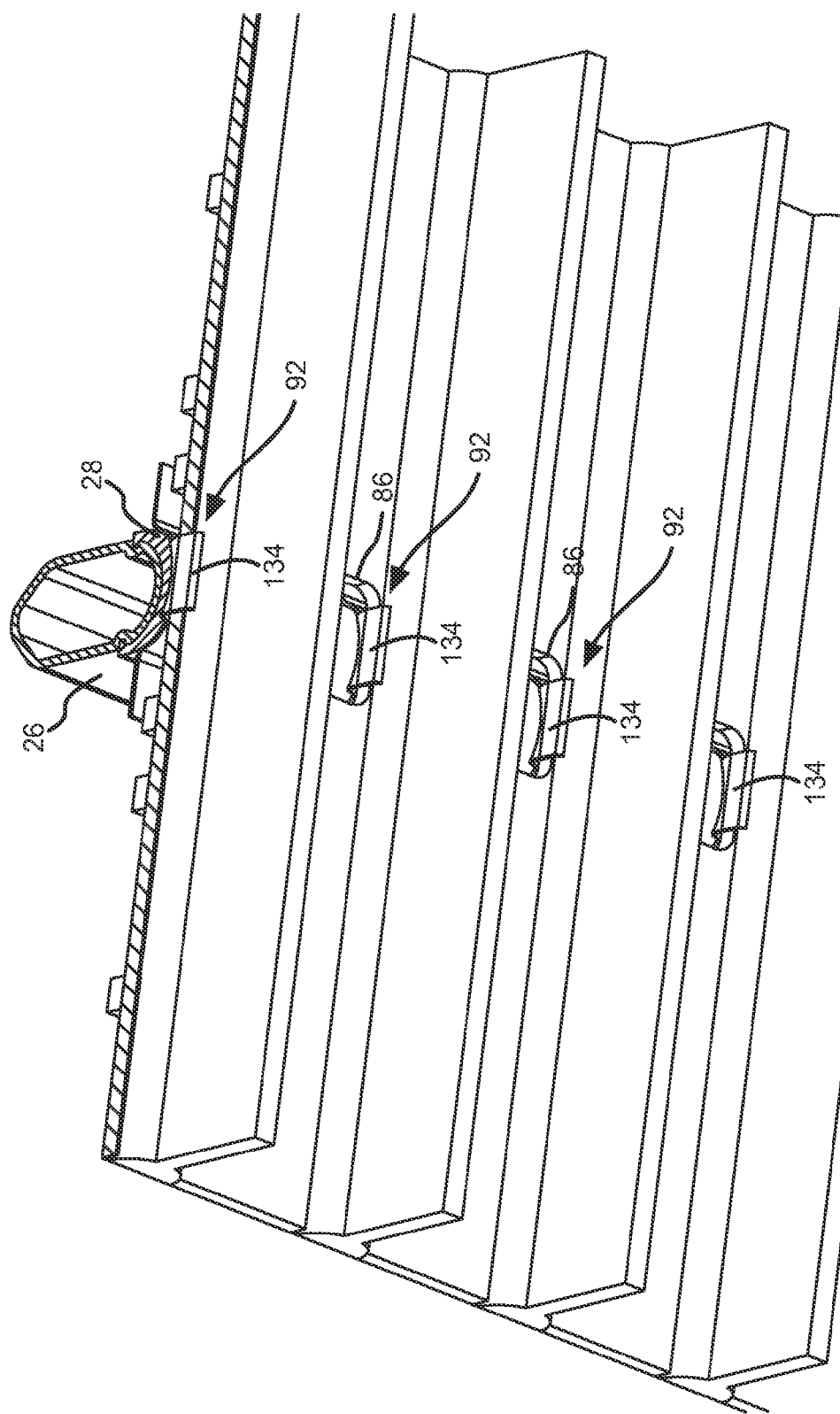

Referring to FIGS. 10A through 10C, in some embodiments a skid rail 26 may have curved lower surface 124 that engages a corresponding concave surface 126 defined by the wear strip 28. The wear strip 28 may have a curved lower surface 128. The wear strip 28 may include ridges 130 that insert within grooves 132 positioned on opposite sides of the skid rail 26 in order to mount the wear strip 28 to the skid rail 26.

In some embodiments, the clips 92 may define a curved seat for receiving the curved lower surface 128 of the wear strip 28. For example, a clip 92 may include lower tabs 134 that partially encircle a portion of the track 22 in order to secure the clip 92, such as in the conventional manner for securing clips 92 to a track 22 as known in the art. Upper tabs 136 may rest on protuberances 138 or ridges extending inwardly from an inner surface of track 22. A curved portion 140 of the clip 92 extends between the tabs 136 and defines a seat for engaging the curved lower surface 128 of the wear strip 28 and permitting rotation of the skid rail 26 within the curved portion 140. As shown the tabs 126 having the curved portion 140 therebetween may be formed of a piece of metal bent to the illustrated shape. As is apparent in the FIGS. 10A and 10B, the curved lower surface 128 extends below the tabs 136. In some embodiments, additional protuberances 142 protrude outwardly from the inner surface of the track 22. The protuberances 142 may engage a sprocket coupled to an engine of the snowmobile 10 or some other structure for driving a track 22.

Referring specifically to FIGS. 10B and 10C, the lugs 84 may extend completely across the track 22 and may cross the clips 92 such that each clip is located over a lug 84. Alternatively, each of the lugs may extend only partially across the width of the track. Other fingers or lug shapes may also be molded into the track. In the illustrated embodiment, a single row of windows 86 are positioned between clips 92 and receive the tabs 134 thereof to secure the clips 92 to the track 22. However, multiple rows of windows may also be used. Referring to FIG. 10D, the configuration of FIGS. 10A-10C advantageously reduces resistance to rotation of the track 22, such as during side hill operation. For example, in response to a torsional force on the track 22, the track 22 may rotate an angle 144 while the curved lower surface 128 remains in engagement with the curved portions 140 of the clips 92. The angle 144 may be limited by the extent of the curved surface 128, e.g. the angular extent subtended by the curved surface 128. Rotation of the track 22 may be limited by engagement of the edge of the curved portion 140 with sides of the skid rail 26. In some embodiments, the maximum value for angle 144 is 45 degrees. In other embodiments the maximum value may be lower, such as 30, 20, or 10 degrees. The angle is preferably limited by the torsional resistance of the track and the idler wheels that guide the track.

Figure 11B:
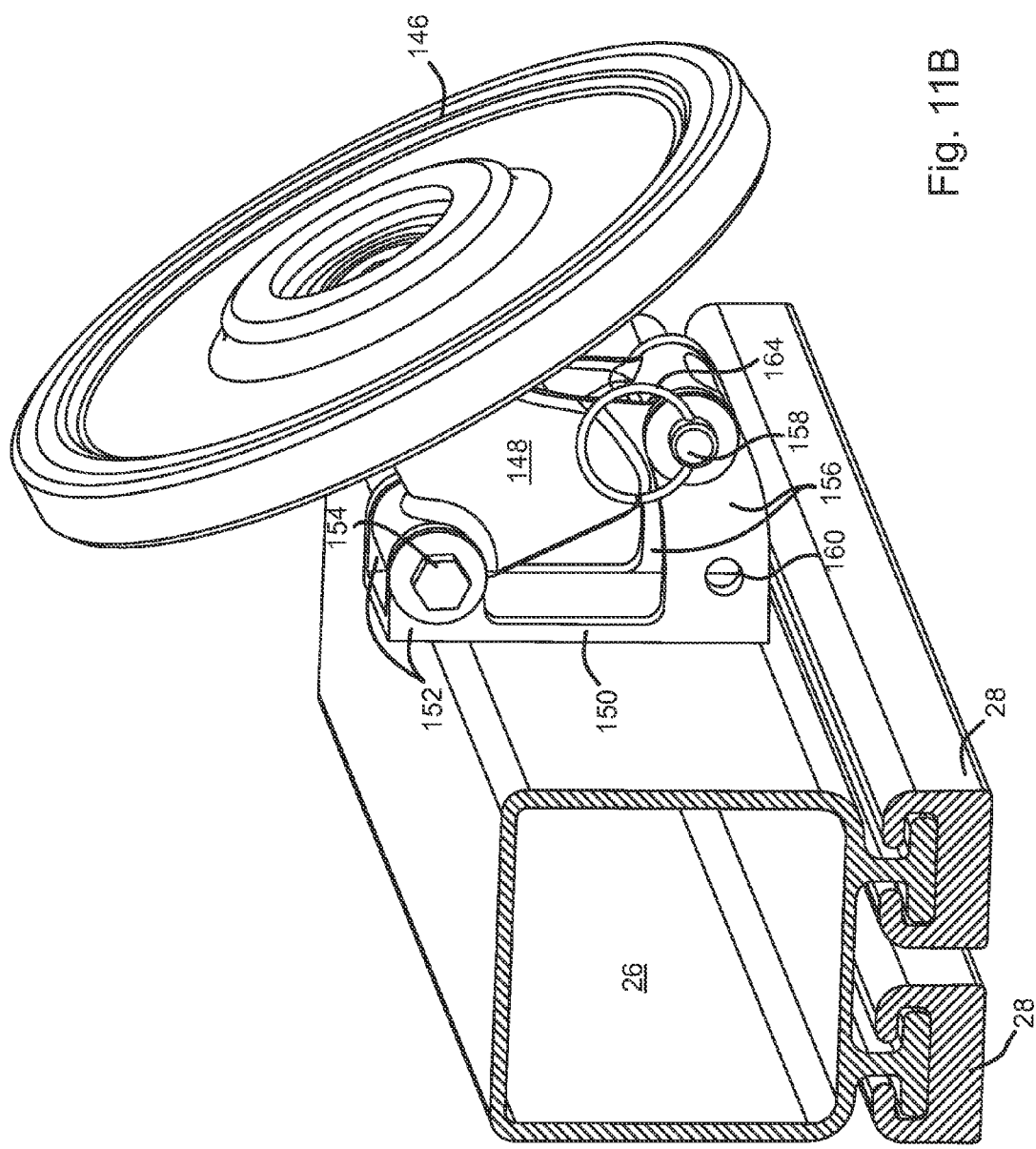

Referring to FIGS. 11A through 11D, in some embodiments, adjustable stops, such as the illustrated structure, may be used to selectively limit or prevent twisting and/or flexing of the track 22 that is otherwise permitted according to the foregoing embodiments. For example, a wheel 146 may be mounted to the skid rail 26, such as at an intermediate position between the rear idler wheels 34 and front idler wheels 32 or forward end of the skid rail 26. As shown in FIGS. 11A and 11B, the wheel 146 is positioned such that the track 22 engages the wheel only upon pivoting of the track 22 by an angle 94 in the vicinity of the wheel 146. The axis of rotation of the wheel 146 may also be oriented at the maximum angle 26, such as within +/−10%, preferably +/−5%, of the maximum angle 94 permitted at the longitudinal position of the wheel 146. The axis of rotation of the wheel 146 may be offset from the track 22 such that a portion of the wheel 146 engages the track 22 at a desired maximum angle 94. The wheel 146 may be longitudinally positioned at a point of maximum deflection of the track 22 in the absence of the wheel 146. The wheel 146 may be positioned substantially longitudinally centered on an unsupported span of the track 22 extending forward of the rear idler wheels 34. For example, the wheel 146 may be positioned within a window centered on the center of the unsupported span, the window having a longitudinal extent of 10%, preferably 5%, more preferably 1%, of the length of the unsupported span. As one example, the unsupported span may extend from the rear idler wheels 34 to any front idler wheels 32.

In the illustrated embodiment, the wheel 146 may be positioned in at least two different positions each having a different maximum angle 94. For example, the wheel 146 may secure to a mount 148 that pivotally engages a bracket 150 mounted to the skid rail 26, such as by means of screws, welds, or the like. For example a pair of upper flanges 152 may engage a pivot 154 passing through the mount 148. For example, the pivot 154 may be a bolt, pin, or other cylindrical structure that constrains the mount 148 to pivot thereabout. The axis of rotation of the pivot 154 may be aligned with the longitudinal direction or longitudinal axis of the skid rail 26.

A lower, or some other, portion of the mount 148 may be pinned to the bracket 150 in order to fix the mount 148 and wheel 146 at a specific angular position. For example, lower flanges 156 of the bracket 150 may receive a pin 158 that passes through the mount 148 thereby fixing the mount 148 and wheel 146 at the illustrated angular position. The pin 158 may include a detent 160 or other structure for maintaining the pin 158 in the illustrated position. As shown in FIG. 11B, a ring 164 or other handle secured to the pin 158 may be used by a user to remove the pin 158 and overcome the retention force of the detent 160. The lower flanges 156 may define one or more additional apertures 162 for receiving the pin 158 and fixing the mount 148 at a different angular position.

Referring specifically to FIGS. 11C and 11D, in some embodiments, the wheel 146 and mount 148 may be fixable in a position that does not substantially allow for pivoting or flexing of the track 22. For example, the pin 158 may be removed from an aperture 166 in the lower flange 156 and inserted through the aperture 162 as well as through the mount 148 to fix the wheel 146 in the illustrated position. As shown in FIG. 11C, the wheel 146 may be separated from the track 22 in the absence of deflection of the track 22. In this manner, when traveling over a planar surface, particularly firm snow or ice, the wheel 146 does not engage the track 22 and therefore does not introduce friction or drag. In some embodiments, a small angular deflection of the track 22 may be allowed, e.g. up to 5 degrees, preferably only up to 2 degrees, when the wheel 146 is at its lowest angular position. The wheels 146 may alternatively be elastically mounted to the rail, such that they can move upwardly under force from the track, but are biased downwardly. A spring (such as a coil spring, torsion spring, or elastomer) may be used to bias the idler wheel. The stiffness of the spring may be selected depending on the type of riding and terrain expected. The spring may be adjustable.

Figure 12B:
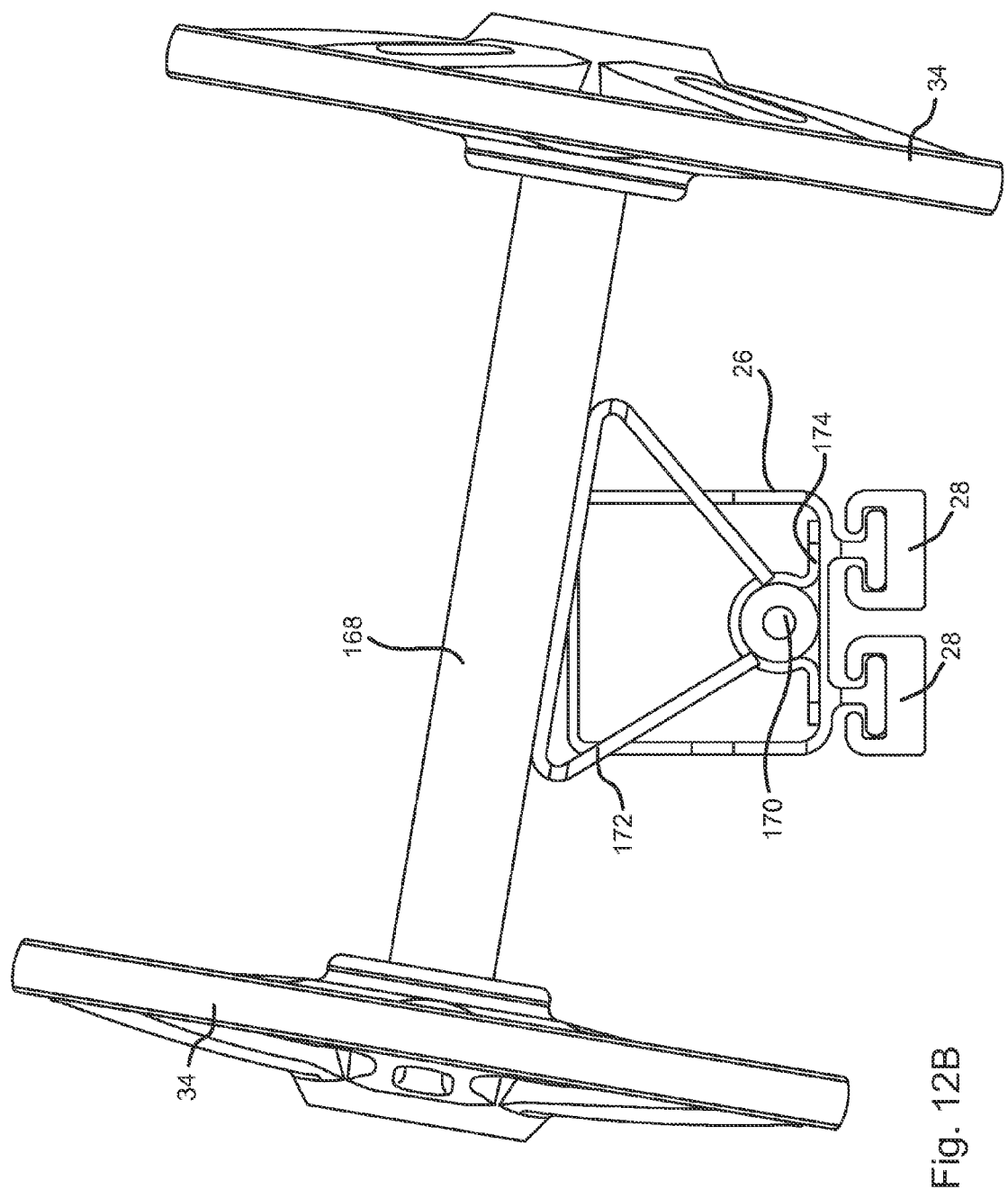

Referring to FIGS. 12A and 12B, in some embodiments, the rear idler wheels 34 may be allowed to pivot freely, or freely within a proscribed angular range responsive to torsional forces on a track 22. The wheels may alternatively be able to pivot, while being biased to a centered or neutral position. For example, an axle 168 or other structure including rear idler wheel receivers 200 (FIG. 9), to which the rear idler wheels 34 are rotatably mounted may be mounted to a pivot 170 having an axis of rotation aligned with the longitudinal direction (into the page of FIG. 12B) and/or the longitudinal axis of the skid rail 26. In the illustrated embodiment, a bracket 172 secures to the axle 168 and maintains the axle 168 offset vertically above the pivot 170. The pivot 170 may be a rod or axle and may pivotally mount to the skid rail at various positions by various pivotal mounting means. In the illustrated embodiment, the skid rail 26 is a hollow beam and the pivot 170 rotatably mounts to an inner surface thereof, such as the inner bottom surface thereof. In the illustrated embodiment, a bracket 174 defines a seating surface engaging the pivot and permitting rotation thereof is used. The bracket 174 may be secured to the skid rail 26 by means of welds, screws, or other fastening means. In operation, the track 22 engaging the rear idler wheels 34 will be in tension such that the pivot 170 may not be restrained against longitudinal movement (within a range) and be held in place by the tension of the tack 22 instead.

While the preferred embodiments of the invention have been illustrated and described, as noted above, many changes can be made without departing from the spirit and scope of the invention. In particular, although the embodiments described above relate to snowmobiles, other tracked vehicles for use on snow or other applications may also advantageously use the embodiments disclosed herein. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A snowmobile comprising:
   a chassis defining a tunnel;
   a pair of runners steerably secured to a front portion of the chassis;
   a skid frame mounted to the chassis below the tunnel, the skid frame comprising a front idler wheel, a rear idler wheel, and a skid surface, the skid surface having a lower portion extending along the longitudinal direction along a major extent of the skid surface in the longitudinal direction; and
   a track encircling the skid frame, the tunnel defining a recess having a width sized to receive the track, the skid surface positioned over a center of the track such that a major portion of the track longitudinally coextensive with the skid surface has first and second unsupported lateral portions on either side of the skid surface, the first and second unsupported lateral portions each extending in a lateral direction transverse to the longitudinal direction from an edge of the skid surface to an outermost edge of the track and having an extent in the transverse direction on one side of the track of at least 25 percent of a width of the track, wherein the first and second unsupported lateral portions extend longitudinally from the front idler wheel to the rear idler wheel.

2. The snowmobile of claim 1, wherein the track defines a plurality of openings through the center of the track, the openings having a width in the horizontal direction substantially equal to a width of the skid surface in the horizontal direction.

3. The snowmobile of claim 2, wherein the track further comprises reinforcing members embedded in the track extending in the horizontal direction between adjacent openings of the plurality of openings.

4. The snowmobile of claim 3, further comprising facing metal clips secured to the track between adjacent openings of the plurality of openings and having an inward facing surface engageable with the skid surface, the inward facing surface having a width in the horizontal direction substantially equal to the width of the plurality of openings.

5. The snowmobile of claim 1, wherein the skid frame includes a longitudinally extending beam having a mounting rail for securing a wear strip thereon for interface with a portion of an inner surface of the track.

6. The snowmobile of claim 1, wherein the skid surface includes a first longitudinal skid surface portion and a second longitudinal skid surface portion parallel to the first longitudinal skid surface portion.

7. The snowmobile of claim 6, wherein the first longitudinal skid surface portion is defined by a first wear strip secured to the skid frame and the second longitudinal skid surface portion is defined by a second wear strip secured to the skid frame.

8. The snowmobile of claim 7, wherein the skid frame includes a longitudinally extending beam having first and second mounting rails extending longitudinally along a lower surface thereof, the first and second wear strips being mounted to the first and second mounting rails, the first and second mounting rails having a cross section including a base portion secured to the longitudinally extending beam and an end portion that is wider than the base portion.

9. The snowmobile of claim 1, wherein the skid frame includes a longitudinally extending beam having a single wear strip covering a planar lower surface thereof.

10. The snowmobile of claim 1, wherein the skid frame includes a longitudinally extending beam having at least one rear idler wheel mounted to the longitudinally extending beam and the skid surface being secured to a lower surface of the beam.

11. The snowmobile of claim 10, wherein the beam of the skid frame includes a closed-section beam portion.

12. The snowmobile of claim 11, wherein the closed-section beam portion includes at least a portion with a rounded top.

13. The snowmobile of claim 10, wherein the beam includes an open inverted generally U-shaped section.

14. The snowmobile of claim 1, wherein the skid surface has a convex lower surface in a plane perpendicular to the longitudinal direction.

15. The snowmobile of claim 1, wherein the skid surface has a rounded lower surface in a plane perpendicular to the longitudinal direction.

16. The snowmobile of claim 1, further comprising a plurality of clips secured to the track, the plurality of clips each defining a concave seat configured to slidably engage the rounded lower surface.

17. The snowmobile of claim 1, further comprising adjustable stops secured to the skid rail the adjustable stops each having a lower surface selectively fixable with respect to the skid rail at a plurality of vertical positions.

18. The snowmobile of claim 17, wherein the adjustable stops each include a wheel rotatably secured to a mount, the mount pivotally secured to the skid rail and selectively fixed to the skid rail at a plurality of angular positions.

19. The snowmobile of claim 1, wherein the rear idler wheel is rotatably secured to a mount, the mount being pivotally mounted to the skid rail and rotatable about an axis of rotation parallel to the longitudinal direction.

20. A skid frame assembly comprising:
   a longitudinal beam defining a lower surface for receiving at least one wear strip, the longitudinal beam having a width in a transverse direction perpendicular to a longitudinal axis of the longitudinal beam;
   a suspension arm member having a first mount portion pivotally secured to the longitudinal beam and second mount portions configured to secure to a chassis of a snowmobile, the second mount portions spanning a mount separation distance in the transverse direction that is at least twice the width of the longitudinal beam, the first mount portion and longitudinal beam being between the second mount portions in the transverse direction; and rear idler wheels secured to a rear idler wheel receivers extending from the longitudinal beam, the rear idler wheels having rolling surfaces separated from one another by an idler separation distance that is less than 60 percent of the mount separation distance.

21. The skid frame assembly of claim 20, further comprising a shock absorber coupled to the longitudinal beam.

22. The skid frame assembly of claim 21, wherein the shock absorber includes two ends, a first end being coupled to a side of the longitudinal beam.

23. The skid frame assembly of claim 22, wherein a second end of the shock absorber is coupled to the suspension arm.

24. The skid frame assembly of claim 20, wherein the second mount portions each include a tube extending in the horizontal direction, the outward facing ends of the tubes of the second mount portions having a separation that is at least twice the width of the longitudinal beam.

25. A skid frame assembly comprising:
a longitudinal beam having a width in a transverse direction perpendicular to a longitudinal axis of the longitudinal beam; and
a suspension arm member having a first mount portion pivotally secured to the longitudinal beam and second mount portions configured to secure to a chassis of a snowmobile, the second mount portions spanning a mount separation distance in the transverse direction that is at least twice the width of the longitudinal beam, the first mount portion and longitudinal beam being between the second mount portions in the transverse direction;
wherein the longitudinal beam has a lower surface and the lower surface includes a first wear strip receiver and a second wear strip receiver extending longitudinally along the lower surface.

26. The snowmobile of claim 25, wherein the first wear strip receiver and the second wear strip receiver include first and second mounting rails, respectively, extending longitudinally along the lower surface, the first and second mounting rails each having a cross section including a base portion secured to the longitudinally extending beam and an end portion that is wider than the base portion.

27. A skid frame assembly comprising:
a longitudinal beam defining a lower surface for receiving a wear strip, the longitudinal beam having a width in a transverse direction perpendicular to a longitudinal axis of the longitudinal beam;
a suspension arm member having a first mount portion pivotally secured to the longitudinal beam and second mount portions configured to secure to a chassis of a snowmobile, the second mount portions spanning a mount separation distance in the transverse direction that is at least twice the width of the longitudinal beam, the first mount portion and longitudinal beam being between the second mount portions in the transverse direction;
a single wear strip extending along the lower surface of the longitudinal beam along a major portion thereof; and
rear idler wheels, the rear idler wheels being separated from one another by an idler separation distance that is less than 60 percent of the mount separation distance.

28. The snowmobile of claim 20, wherein the longitudinal beam includes a closed-section beam.

29. The snowmobile of claim 20, wherein the longitudinal beam includes a constant cross section portion and a tapered portion, the tapered portion being angled with respect to the constant cross section portion.

30. The snowmobile of claim 20, wherein the mount separation distance is at least three times greater than the width of the longitudinal beam.

31. A snowmobile comprising:
a chassis;
a skid frame mounted to the chassis and including a skid surface, a front idler wheel, and a rear idler wheel, the skid surface defining a longitudinal direction, the skid surface extending along the longitudinal direction forward of the rear idler wheel;
a track encircling the skid frame, the skid surface positioned over a center of the track such that a major portion of the track coextensive with the skid surface has first and second unsupported lateral portions on either side of the skid surface, the first and second unsupported lateral portions each extending in a transverse direction perpendicular to the longitudinal direction from an edge of the skid surface to an outermost edge of the track and having an extent in the horizontal direction of at least 25 percent of a width of the track, wherein the unsupported lateral portions extend longitudinally from the front idler wheel to the rear idler wheel; and
a suspension arm member having a first mount portion pivotally secured to the skid frame and second mount portions secured to the chassis, the second mount portions spanning a mount separation distance in the horizontal direction that is at least twice the width of the skid surface, the first mount portion and skid surface being substantially centered between the second mount portions.

* * * * *